United States Patent

Ando et al.

[11] Patent Number: 5,841,572
[45] Date of Patent: Nov. 24, 1998

[54] LENS ARRAY SHEET, SURFACE LIGHT SOURCE, AND TRANSMISSION TYPE DISPLAY DEVICE

[75] Inventors: Rika Ando; Haruo Ono; Hisanori Ishida; Michiko Takeuchi; Toshikazu Nishio; Nobu Masubuchi, all of Tokyo-to, Japan

[73] Assignee: Dai Nippon Printing Co., Ltd., Japan

[21] Appl. No.: 69,966

[22] Filed: Apr. 30, 1998

Related U.S. Application Data

[62] Division of Ser. No. 523,609, Sep. 5, 1995.

[30] Foreign Application Priority Data

| Sep. 6, 1994 | [JP] | Japan | 6-236017 |
| May 18, 1995 | [JP] | Japan | 7-142386 |
| Jun. 12, 1995 | [JP] | Japan | 7-167861 |

[51] Int. Cl.$^6$ .................................................. G03B 21/00
[52] U.S. Cl. ............................ 359/456; 359/443; 359/19
[58] Field of Search .............................. 359/19, 20, 443, 359/453, 455, 456, 460

[56] References Cited

U.S. PATENT DOCUMENTS

5,592,332  1/1997  Nishio et al. ........................ 359/19

*Primary Examiner*—Daniel P. Malley
*Attorney, Agent, or Firm*—Parkhurst & Wendel, LLP

[57] ABSTRACT

A lens array sheet according to the present invention, comprising a transparent substrate, a lens array having lens elements that are one-dimensionally or two-dimensionally formed on the front surface of the transparent substrate, and a cluster having a large number of cluster members randomly formed in a prism shape on the rear surface of the transparent substrate, each of the length, the width, and the height of each of the cluster members being in the range from the wave length of source light to 500 $\mu$m. Thus, a lens array sheet that effectively uses light energy of the light source, maintains the light condensing effect, prevents the luminance from deteriorating, homogeneously distributes the luminance on the light emitting surface, prevents equal-thickness interference fringes and wasteful light dispersion to out of the angular range of visual angle can be provided. In addition, a surface light source having the lens array sheet is provided. Moreover, a bright transmission type display device having the surface light source is provided.

18 Claims, 18 Drawing Sheets

LENS ARRAY SHEET, SURFACE LIGHT SOURCE, AND TRANSMISSION TYPE DISPLAY DEVICE

This is a Division of application Ser. No. 08/523,609 filed Sep. 5, 1995.

BACKGROUND OF THE INVENTION

1. Field of the Invention

The present invention relates to a lens array sheet that has a homogeneous lighting characteristic as a lighting means for use with a transmission type liquid crystal display device, a back light source for a transmission type display device for an advertisement board. In addition, the present invention relates to a surface light source and a transmission type display device with the lens array sheet.

2. Description of the Related Art

In recent years, requirements for low weight and low power consumption have been made for transmission type liquid crystal devices. Various surface light sources that effectively use light emitted from light sources and a guide the resultant light only to a necessary and satisfactory direction have been proposed.

In these related art references, a light source is disposed on a side surface of an optical conductor composed of a plate of, for example, a transparent acrylic resin. The light entered from the side surface into the optical conductor is reflected on a reflection layer on the rear surface of the optical conductor. The light is emitted from the light emitting surface that is the upper surface of the optical conductor (light guide). At this point, to homogenize the light, a diffusion sheet is disposed on the upper surface of the optical conductor. Alternatively, to condense the light as emitted light only within predetermined angular range, a lens array sheet that operates as a lens is disposed as a surface light source. The surface light source of which the light source is disposed on the side surface of the optical conductor is referred to as an edge light type surface light source.

Although a box-type planar light source of which a light source is disposed immediately below a diffusion sheet or a lens array sheet is known, since the thickness thereof increases, the application thereof is limited.

As described above, various methods for effectively using light emitted from light sources without loss have been proposed. As an example, a lens array sheet for condensing light as emitted light within a predetermined angular range is known. As shown in FIG. 24, the linear lens array sheet is composed of a large number of triangular prisms as lens elements that are one-dimensionally arranged so that their edge lines are arranged in parallel. In addition, a two-layer type linear lens array sheet has been proposed so as to condensed more light and improve the luminance.

For example, two-layer type linear lens array sheets of which linear triangular prisms are arrayed as lens elements have been disclosed in Japanese Patent Laid-Open Publication Nos. 5-203950, 5-313156, and 5-313164.

However, although the two-layer lens array sheet has an advantage of an improvement of luminance due to the light condensing effect, it also has the following disadvantage. In the lens array sheet of which the lens elements are arrayed on the front surface and of which the rear surface is flat, the rear surface of the upper lens array sheet microscopically contacts the vertex portions of the lens elements of the lower lens array sheet. Thus, the optically transparent contact portion accords with the vertex portions of the lower lens elements. Consequently, the lens vertex portions become visible. When the lens elements are triangular prisms, the vertex portions are shaped as edge lines. As a result, many lines are visible.

Due to small differences of the distances of lens elements of the two lens array sheets, Newton rings that are equal-thickness interference fringes as a concentric circle pattern or a concentric ellipse pattern may occur on the entire surface of the surface light source.

To prevent such a problem, the rear surface of the lens array sheet is matted so as to form small concave and convex portions (hereinafter referred to as a cluster). Thus, the lens array sheets are prevented from contacting. This method has been disclosed in Japanese Patent Laid-Open Publication No. 7-151909.

However, when the rear surface of the lens array sheet is matted, light is diffuse-reflected on the matted surface. Thus, the matted surface operates as a light diffusion sheet. Consequently, the function of the lens array sheet, which condenses light in a desired diffusion angle within a desired diffusion angle is remarkably deteriorated. Thus, the luminance is remarkably decreased. In addition, since the height of each portion of the cluster of the matted surface is not completely homogeneous, there are small differences in the distances of the lens elements of the two lens array sheets (hereinafter, each portion of the cluster is referred to as a cluster member). Thus, the equal-thickness interference fringes tend to take place.

On the other hand, in the structure of which only one lens array sheet is used, in the case that the rear surface of the lens array sheet is smooth, when the lens array sheet is disposed on the light emitting surface of an optical conductor of an edge light type surface light source, since the lens array sheet contacts the light emitting surface of the optical conductor, they are optically unified. Thus, the emitted light of the light source cannot be homogeneously total-reflected on the front surface of the optical conductor. Even if spacers are disposed at four corners of the optical conductor or the lens array sheet so as to have a space between the optical conductor and the lens array sheet, since the lens array sheet is bent and deformed, small differences in distances of the lens elements of the lens array sheet and the optical conductor cause the equal-thickness interference fringes to take place. To prevent this problem, a structure of which a cluster with a height of the wave length of a source light or larger is formed has been disclosed in for example Japanese Patent Laid-Open Publication Nos. 5-323319 and 6-324205.

However, the cluster is formed as an optically-homogeneous diffusion pattern such as a sand-face pattern or a pear-face pattern. Thus, part of light emitted from the optical conductor diffuses out of the angular range of visual field. Consequently, the light condensing effect of the lens array sheet deteriorates and thereby wasting the energy of the light of the light source and deteriorating the luminance.

SUMMARY OF THE INVENTION

An object of the present invention is to provide a lens array sheet that can solve the above-described problems, effectively use light energy of the light source, maintain the light condensing effect, prevent the luminance from deteriorating, homogeneously distribute the luminance on the light emitting surface, prevent equal-thickness interference fringes and wasteful light dispersion to out of the angle of visual angle from taking place. Another object of the present invention is to provide a surface light source having the lens array sheet. A further other object of the present invention is to provide a light transmission type display device having the surface light source.

To accomplish the objects, a lens array sheet according to the first aspect of the present invention comprises a transparent substrate, a lens array having lens elements that are one-dimensionally or two-dimensionally formed on the front surface of the transparent substrate, and a cluster having a large number of cluster members randomly formed in a prism shape on the rear surface of the transparent substrate, each of the length, the width, and the height of each of the cluster members being in the range from the wave length of source light to 500 μm.

In the lens array sheet, each of the cluster members may be formed in a rectangular parallelepiped shape.

In the lens array sheet, the line of intersection of a horizontal surface of the lens array sheet and a surface that composes the lens elements may be not in parallel with the line of intersection of the horizontal surface and a side surface of each of the rectangular parallelepiped shape of the cluster members.

A surface light source according to the first aspect of the present invention comprises an optical conductor composed of at least a transparent flat plate, a light source unit disposed adjacent to at least one of side edge surfaces of the optical conductor, a light reflection layer formed on the rear surface of the optical conductor, and one or two lens array sheets of the first aspect of the present invention and disposed on a light emitting surface of the front surface of the optical conductor so that the lens array sheets face the front surface of the optical conductor.

In the edge light type surface light source, the lens array sheet may be composed of two lens array sheet members that are layered, the cluster of the lower lens array sheet member facing the front surface of the optical conductor.

The edge light type surface light source may comprise a light diffusion sheet formed on the light emitting surface that is the front surface of the optical conductor and having concave and convex portions on the front and rear surfaces, the height of the concave and convex portions being homogeneous to or greater than the wave length of source light, a rear-surface flat lens array sheet having a lens array with lens elements that are one-dimensionally or two-dimensionally formed on the front surface of the transparent substrate, the rear surface of the rear-surface flat lens array sheet facing the front surface of the optical conductor, and a lens array sheet of the first aspect of the present invention, wherein the light diffusion sheet, the rear-surface flat lens array sheet, and the lens array sheet of the present invention are layered in the order.

The transparent type display device of the first aspect of the present invention comprises a surface light source of the first aspect of the present invention, the surface light source being used as a back light source for the transmission type display device.

Thus, according to the transmission type display device of the first aspect of the present invention, since the cluster is formed on the rear surface, when two lens array sheets are layered or a lens array sheet is disposed as a surface light source on the light emitting surface of the optical conductor, the rear surface of the lens array sheet can be prevented from being contacted, thereby suppressing the equal-thickness interference fringes from taking place. When the lens array sheet is disposed on the optical conductor in such a manner that the rear surface of the lens array sheet (on which the cluster is formed) faces the optical conductor, since the light distribution is not affected by the total reflection on the front surface of the optical conductor, light is homogeneously emitted with a homogeneous luminance distribution on the entire surface of the light emitting surface. In other words, the amount of light that is emitted out of the angular range of visual field is reduced and thereby the decrease of the luminance within angular ranges of visible field can be minimized in comparison with the conventional contact preventing method using the mat process In addition, since the cluster members that compose the cluster are randomly formed, the moire fringes due to the interference of lens array or pixel array of the liquid crystal display device and the cluster members can be prevented.

When the cluster members are formed in a rectangular parallelepiped shape, the transmission type display device can be easily fabricated. In addition, when the relation between the side surface of the rectangular parallelepiped cluster and the surface of the lens elements of the lens array is designated in a predetermined manner, the moire fringes due to the lens array can be prevented.

According to the edge light type surface light source of the first aspect of the present invention, since the lens array sheet does not contact the light emitting surface of the optical conductor, the light emitted from the light source can be widely and homogeneously distributed in the optical conductor. Thus, the luminance distribution of the light emitted from the optical conductor can be homogenized on the light emitting surface. In addition, the light energy can be effectively used and thereby be bright. Moreover, the light diffusion dot pattern which is formed in the rear surface of the optical conductor can become invisible. The amount of light that is emitted in the vicinity of the normal direction of the light emitting surface is large. In addition, the amount of light that is emitted in other than the normal direction can be reduced in comparison with the homogeneous diffusion sheet.

According to the transmission type display device of the first aspect of the present invention, the light emitted from the display surface is bright on the entire surface regardless of the angular range of visual field within the predetermined angular range.

To accomplish the objects, a lens array sheet according to the second aspect of the present invention comprises a transparent substrate, a lens array having lens elements that are one-dimensionally or two-dimensionally formed on the front surface of the transparent substrate, and a cluster having a large number of cluster members randomly formed in a prism shape on the rear surface of the transparent substrate, each of the length, the width, and the height of each of the cluster members being in the range from the wave length of source light to 500 μm.

The random two-dimensional distribution is a distribution of which the position of each lattice point of the two-dimensional periodic array is randomly moved and reallocated.

In lens array sheet, each of the cluster members may be formed in a rectangular parallelepiped shape.

In the lens array sheet, the line of intersection of a horizontal surface of the lens array sheet and a surface that composes the lens elements may be not in parallel with the line of intersection of the horizontal surface and a side surface of each of the rectangular parallelepiped shape of the cluster members.

A surface light source according to the second aspect of the present invention comprises an optical conductor composed of at least a transparent flat plate, a light source unit disposed adjacent to at least one of side edge surfaces of the optical conductor, a light reflection layer formed on the rear surface of the optical conductor, and one or two lens array sheets of the second aspect of the present invention and disposed on a light emitting surface of the front surface of the optical conductor so that the lens array sheets face the front surface of the optical conductor.

In the edge light type surface light source, the lens array sheet may be composed of two lens array sheet members that are layered, the cluster of the lower lens array sheet member facing the front surface of the optical conductor.

The edge light type surface light source may comprise a light diffusion sheet formed on the light emitting surface that is the front surface of the optical conductor and having concave and convex portions on the front and rear surfaces, the height of the concave and convex portions being homogeneous to or greater than the wave length of source light, a rear-surface flat lens array sheet having a lens array with lens elements that are one-dimensionally or two-dimensionally formed on the front surface of the transparent substrate, the rear surface of the rear-surface flat lens array sheet facing the front surface of the optical conductor, and a lens array sheet of the second aspect of the present invention, wherein the light diffusion sheet, the rear-surface flat lens array sheet, and the lens array sheet are layered in that order.

A transparent type display device according to the second aspect of the present invention comprises a surface light source of the second aspect of the present invention.

Thus, according to the transmission type display device of the second aspect of the present invention, since the cluster is formed on the rear surface, when two lens array sheets are layered or a lens array sheet is disposed as a surface light source on the light emitting surface of the optical conductor, the rear surface of the lens array sheet can be prevented from being contacted, thereby suppressing the equal-thickness interference fringes from taking place. When the lens array sheet is disposed on the optical conductor in such a manner that the rear surface of the lens array sheet (on which the cluster is formed) faces the optical conductor, since the light distribution is not affected by the total reflection on the front surface of the optical conductor, light is homogeneously emitted with a homogeneous luminance distribution on the entire surface of the light emitting surface. In other words, the amount of light that is emitted out of the angular range of visual field is reduced and thereby the decrease of the luminance can be minimized in comparison with the conventional contact preventing method using the mat process. In particular, since the cluster members are randomly distributed with a homogeneous surface density of the number of cluster members, uneven luminance does not take place.

In addition, since the cluster members that compose the cluster are randomly formed by the predetermined randomizing method, the homogeneous luminance distribution without an uneven distribution of the density of the cluster member regardless of the number of the cluster members can be accomplished and thereby the moiré fringes due to the interference of lens array and pixel array of the liquid crystal display device can be prevented.

When the cluster members are formed in a rectangular parallelepiped shape, the transmission type display device can be easily fabricated. In addition, when the relation between the side surface of the rectangular parallelepiped cluster and the surface of the lens elements of the lens array is designated in a predetermined manner, the moire fringes due to the lens array can be prevented.

According to the edge light type surface light source of the second aspect of the present invention, since the lens array sheet does not contact the light emitting surface of the optical conductor, the light emitted from the light source can be widely and homogeneously distributed in the optical conductor. Thus, the luminance distribution of the light emitted from the optical conductor can be homogenized on the light emitting surface. In addition, the light energy can be effectively used and thereby be bright. Moreover, the light diffusion dot pattern can become invisible. The amount of light that is emitted in the vicinity of the normal direction of the light emitting surface is large. In addition, the amount of light that is emitted in other than the normal direction can be reduced in comparison with the homogeneous diffusion sheet.

According to the transmission type display device of the second aspect of the present invention, the light emitted from the display surface is bright on the entire surface regardless of the angular range of visual field.

To accomplish the objects, a lens array sheet according to the third aspect of the present invention comprises a transparent substrate, a lens array having lens elements that are one-dimensionally or two-dimensionally formed on the front surface of the transparent substrate, and a cluster having a large number of cluster members randomly formed in a prism shape on the rear surface of the transparent substrate, wherein each of the cluster members is composed of cluster member elements formed in a prism shape or a truncated prismoid shape, each of the length of the minimum diagonal line and the height of the top and bottom of each of the cluster member elements being homogeneous to or greater than the wave length of the source light, each of the length of the maximum diagonal line and the height thereof being homogeneous to or smaller than 500 $\mu$m, the cluster member elements being allocated to structural elements of a percolation cluster in a two-dimensional lattice with a critical percolation concentration Pc or smaller, adjacent cluster member elements being fused.

In the lens array sheet, lattice points of the two-dimensional lattice may be allocated to the cluster member elements with an occupying probability P that may be smaller than the critical percolation concentration Pc, the cluster members being composed by fusing the adjacent cluster member elements.

In the lens array sheet, the two-dimensional lattice may be a square lattice, the lattice member elements allocated to the lattice points being formed in a rectangular parallelepiped shape.

In the lens array sheet, the line of intersection of the horizontal surface of the lens array sheet and the surface composing each of the lens elements may be not in parallel with the line of intersection of the horizontal surface and a side surface of each of the cluster members.

A surface light source according to the third aspect of the present invention comprises an optical conductor composed of at least a transparent flat plate, a light source unit disposed adjacent to at least one of side edge surfaces of the optical conductor, a light reflection layer formed on the rear surface of the optical conductor, and one or two lens array sheets of the third aspect of the present invention and disposed on a light emitting surface of the front surface of the optical conductor so that the lens array sheets face the front surface of the optical conductor.

In the edge light type surface light source, the lens array sheet may be composed of two lens array sheet members that are layered, the cluster of the lower lens array sheet member facing the front surface of the optical conductor.

The edge light type surface light source may comprise a light diffusion sheet formed on the light emitting surface that is the front surface of the optical conductor and having concave and convex portions on the front and rear surfaces, the height of the concave and convex portions being homogeneous to or greater than the wave length of source light, a rear-surface flat lens array sheet having a lens array with lens elements that are one-dimensionally or two-dimensionally formed on the front surface of the transparent substrate, the rear surface of the rear-surface flat lens array sheet facing the front surface of the optical conductor, and a lens array sheet of the third aspect of the present invention, wherein the light diffusion sheet, the rear-surface flat lens array sheet, and the lens array sheet are layered in the order.

A transparent type display device according to the third aspect of the present invention comprises a surface light source of the third aspect of the present invention, the surface light source being used as a back light source for the transmission type display device.

Thus, according to the transmission type display device of the third aspect of the present invention, since the cluster is formed on the rear surface, when two lens array sheets are layered or a lens array sheet is disposed as a surface light source on the light emitting surface of the optical conductor, the rear surface of the lens array sheet can be prevented from being contacted, thereby suppressing the equal-thickness interference fringes from taking place. When the lens array sheet is disposed on the optical conductor in such a manner that the rear surface of the lens array sheet (on which the cluster is formed) faces the optical conductor, since the light distribution is not affected by the total reflection on the front surface of the optical conductor, light is homogeneously emitted with a homogeneous luminance distribution on the entire surface of the light emitting surface. In other words, the amount of light that is absorbed or emitted out of the angular range of visual field is reduced and thereby the decrease of the luminance can be minimized in comparison with the conventional contact preventing method using the mat process.

In particular, the shape of the cluster is fractal and randomly formed. Thus, although the average rotating radius is large, non-cluster portions are randomly formed in the radius. Consequently, the cluster is invisible and uneven luminance hardly takes place.

In addition, since the cluster members that compose the cluster are randomly shaped and formed by the predetermined randomizing method corresponding to the theory of percolation, the homogeneous luminance distribution without an uneven distribution of the density of the cluster member regardless of the number of the cluster members can be accomplished and thereby the moiré fringes due to the interference of lens array and pixel array of the liquid crystal display device can be prevented.

When the cluster members are formed in a rectangular parallelepiped shape, the transmission type display device can be easily fabricated. In addition, when the relation between the side surface of the rectangular parallelepiped cluster and the surface of the lens elements of the lens array is designated in a predetermined manner, the moiré fringes due to the lens array can be prevented.

According to the edge light type surface light source of the third aspect of the present invention, since the lens array sheet does not contact the light emitting surface of the optical conductor, the light emitted from the light source can be widely and homogeneously distributed in the optical conductor. Thus, the luminance distribution of the light emitted from the optical conductor can be homogenized on the light emitting surface. In addition, the light energy can be effectively used and thereby be bright. Moreover, the light diffusion dot pattern can become invisible. The amount of light that is emitted in the vicinity of the normal direction of the light emitting surface is large. In addition, the amount of light that is emitted in other than the normal direction can be reduced in comparison with the homogeneous diffusion sheet.

According to the transmission type display device of the third aspect of the present invention, the light emitted from the display surface is bright on the entire surface regardless of the angular range of visual field.

These and other objects, features and advantages of the present invention will become more apparent in light of the following detailed description of best mode embodiments thereof, as illustrated in the accompanying drawings.

DETAILED DESCRIPTION OF THE PREFERRED EMBODIMENTS

First, with reference to FIGS. 1 to 6, a lens array sheet according to a first aspect of the present invention will be described.

Figure 1:
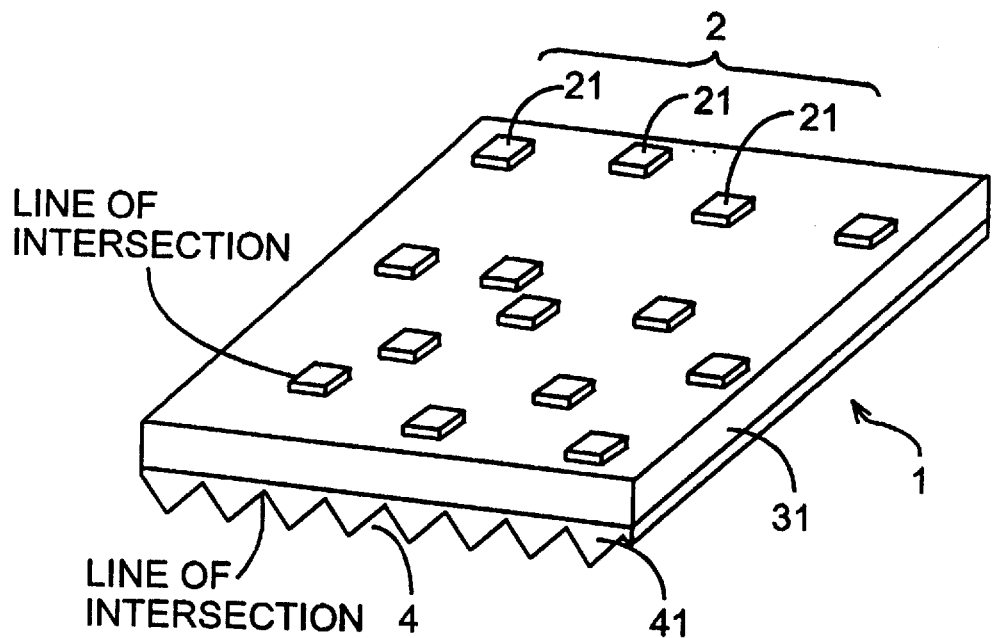
FIG. 1 is a perspective view showing a lens array sheet according to an embodiment of a first aspect and a second aspect of the present invention.

FIG. 1 is a perspective view showing a lens array sheet according to the first aspect of the present invention. A lens array sheet 1 according to the first aspect of the present invention shown in FIG. 1 is composed of a transparent substrate sheet 31, a lens array 4, and a cluster 2. The lens array 4 is composed of a large number of triangular prisms as lens elements 41 that are adjacently and one-dimensionally arranged on a first surface of the transparent substrate sheet 31 so that the edge lines of the lens elements 41 are arranged in parallel. The cluster 2 is composed of a large number of cluster members 21 that are formed in a rectangular parallelepiped shape and randomly and two-dimensionally arranged on the entire second surface (rear surface) of the transparent substrate sheet 31. In FIG. 1, the cluster 2 is drawn on the second surface (front surface) for convenience of drawings.

The lens array sheet according to the first aspect of the present invention features the cluster formed on the opposite surface of the lens array. The cluster is composed of a large number of cluster members that are formed in a prism shape. The length of each side of each cluster member is in the range from the wave length of the light of the light source to 500 $\mu$m. The cluster members are randomly and two-dimensionally disposed on the entire surface of the second surface of the lens array sheet.

Each cluster member 21 is formed in a prism shape. The prism shape includes a triangular prism, a quadrangular prism, a pentagonal prism, and a hexagonal prism. The quadrangular prism includes a rhombus-shape prism, a square-shape prism, and so forth. Among these shapes, a quadrangular prism formed in a rectangular parallelepiped shape is preferable from a view point of easy fabrication.

Figure 2:
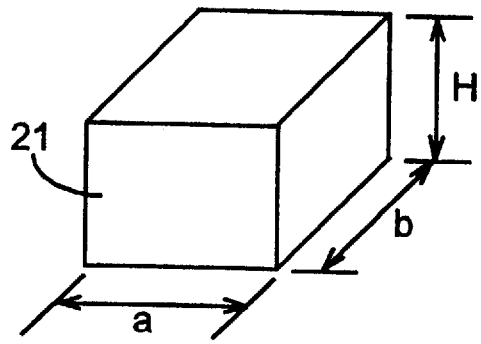
FIG. 2 is a perspective view showing the shape of a cluster member of the lens array sheet according to the embodiment of the first aspect and the second aspect of the present invention.

FIG. 2 is a perspective view showing a cluster member 21 formed in a rectangular parallelepiped shape. The relation among the height H, the width a, and the depth b may be either a=b=H (cube), a=b≠H, a≠b=H, or a≠b≠H.

Figure 3:
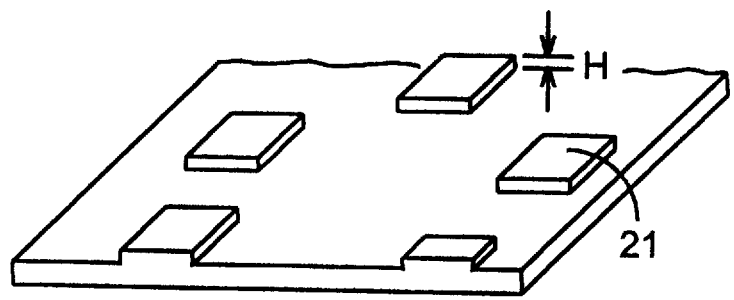
FIG. 3 is an enlarged perspective view for explaining cluster members formed on the lens array sheet.

As exemplified in FIG. 3, when the lens array sheet is disposed, the cluster members function as spacers for another lens array sheet or the light emitting surface of the optical conductor. In the case that the height H of each cluster member on the entire surface of the lens array sheet is the same, when the lens array sheet is disposed, it is not bent and homogeneous distance can be maintained. Thus, Newton rings hardly take place. The width a and the depth b can be varied for each cluster member. However, it is preferable to designate the same value to each of the width a and the depth b for each cluster member.

The size of each of the height H, the width a, and the depth b is preferably in the range from the wave length of the source light to 500 $\mu$m, more preferably to 125 $\mu$m. When the source light has a spectrum distribution, the size of each of the height H, the width a, and the depth b should be homogeneous to or greater than the maximum wave length of the spectrum of the visible light. When the size of each of the height H, the width a, and the depth b is smaller than the wave length of the light, the occurrence of the equal-thickness interference fringes or the unification due to the optical contact of the lens array sheet and the optical conductor cannot be effectively prevented. On the other hand, when the size of each of the height H, the width a, and the depth b exceeds 500 μm, the lens array sheet tends to bend and deform. Thus, moire fringes tend to take place between the pixels of the display device or the fabrication of the lens array sheet becomes difficult. Consequently, it is worthless to increase the size.

Next, the reason that the height H of each cluster member 21 should be homogeneous to or greater than the wave length of the source light will be described.

Assume the case that the lens array sheet is disposed on a plate-shape optical conductor so that the rear surface of the lens array sheet contacts the front surface of the optical conductor.

Figure 34:
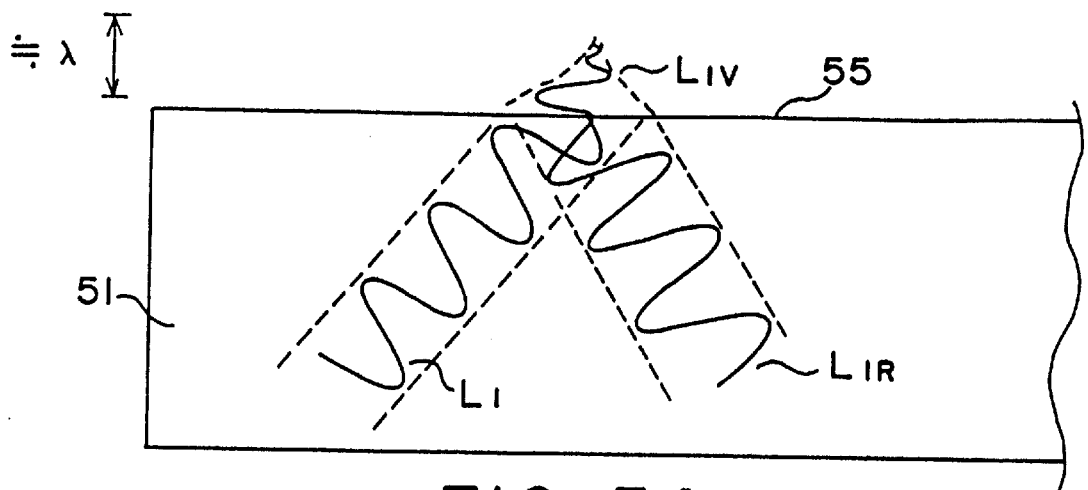
FIG. 34 is a schematic diagram for explaining a microscopic action of light that travels from the inside of an optical conductor to the outside.

As shown in FIG. 34, when incident light $L_1$ that travels from the inside of an optical conductor 51 to air reaches the front surface 55 of the optical conductor that is an interface between the optical conductor 51 and air, if the incident angle θ is greater than the critical angle θc, a total reflection takes place. Thus, all the energy of the incident light $L_1$ becomes reflection light $L_{1R}$, not travels into the air.

However, when this phenomenon is microscopically observed, the electromagnetic field of the incident light permeates from the front surface 55 of the optical conductor to the air for a distance of around the wave length λ of the source light due to the tunnel effect. The intensity of the permeated tunnel effect electromagnetic field $L_{1v}$ attenuates exponentially in proportion to the permeated distance. When the light travels in the air for the distance of around the wave length λ, it returns to the optical conductor 51 side. Thus, when this phenomena is macroscopically observed, all the light energy is reflected on the front surface 55 of the optical conductor.

Figure 35:
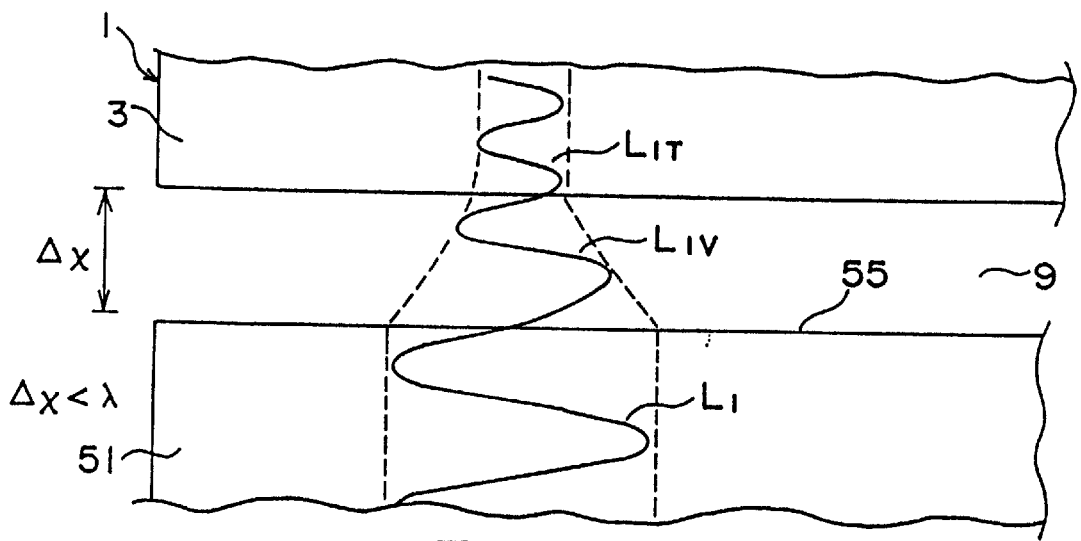
FIG. 35 is a schematic diagram for explaining a microscopic action of light that travels from the optical conductor to the lens array sheet spaced apart therefrom for a small distance corresponding to tunnel effect.

Thus, as shown in FIG. 35, when the distance ΔX between the lens array sheet 1 and the front surface of the optical conductor approaches the distance smaller than the wave length of the source light (ΔX<λ), the tunnel effect electromagnetic field $L_{1v}$ that has not been completely attenuated becomes a progressive-wave (output light) in the lens array sheet 1. Thus, the light travels in the lens array sheet 1.

Thus, when the height H of each cluster member 21 is smaller than λ, the light emitted from the optical conductor is not totally reflected on the entire front surface 55 of the optical conductor. Thus, as with incident light $L_1$, $L_2$, and $L_3$ shown in FIG. 36, rays of light in the vicinity of the light source that have most of light energy of the light source are emitted from the front surface of the optical conductor regardless of whether or not their incident angle θ is smaller than the critical angle. Thus, the luminance of the output light in the vicinity of the light source is high due to the presence of the light $L_1$ to $L_3$. However, the intensity of rays of light that are distributed to portions away from the light source is weak. As with light $L_4$, since the distance between the light and the front surface of the optical conductor is long and the intensity thereof is attenuated, the luminance of the light in the vicinity of the light source is high. In other words, the luminance of the light apart from the light source is low.

Figure 36:
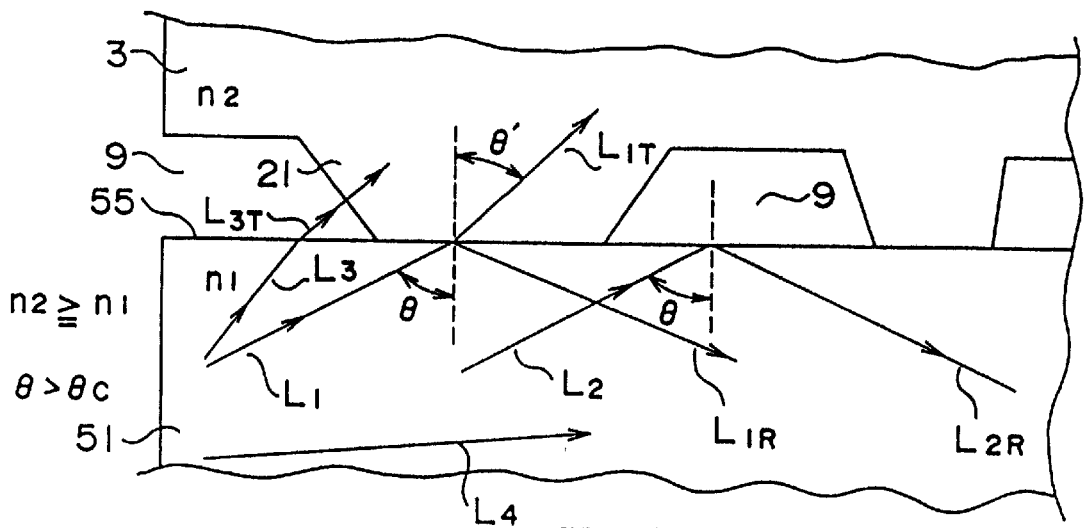
FIG. 36 is a schematic diagram for explaining that the contact portion of the cluster of the lens array sheet according to the first to third aspects of the present invention and the front surface of the optical conductor contributes the distribution of the light in the optical conductor.

On the other hand, when the height H of each cluster member 21 is homogeneous to or greater than λ, namely $$H \geq \lambda \qquad \text{[Formula 1]}$$

even in the vicinity region of the light source, at a portion of which the cluster member 21 contacts the optical conductor 51, as with the light $L_3$ of FIG. 36, rays of light with incident angles smaller than the critical angle travel from the front surface 55 of the optical conductor. On the other hand, part of incident light $L_1$ and $L_2$ of with incident angles θ homogeneous to or greater than the critical angle are totally reflected and transmitted to a light reflection layer on the far side of the optical conductor. Part of light that is diffusion-reflected are entered into the front surface 55 of the optical conductor with an incident angle smaller than the critical angle. In other words, as with the light $L_1$ of FIG. 36, light entered into the portion of which the cluster member 21 contacts the front surface 55 of the optical conductor becomes output light as with $L_{1T}$. On the other hand, the light that enters a space portion 9 with a length homogeneous to or greater than the wave length λ of the light is totally reflected on the front surface 55 of the optical conductor and distributed to the far region. Thus, in a region far from the light source, the amount of the light emitted from the front surface of the optical conductor is satisfactorily high.

As described above, when the lens array sheet with the cluster members 21 whose height H is homogeneous to or greater than λ is disposed on the optical conductor so that the lens array sheet faces the front surface of the optical conductor, light with a homogeneous luminance distribution in the entire region on the front surface of the optical conductor can be obtained.

Next, the structure of which two lens array sheets are layered will be described. As was proposed with Japanese Patent Laid-Open Publication No. 5-323214 by the applicant of the present invention (not disclosed when the application of the present invention was filed), the condition for causing the equal-thickness interference fringes to disappear is expressed by the following formula.

$$H \geq \lambda/(2\Delta\phi^2) \qquad \text{[Formula 2]}$$

where H is the height of each cluster member 21; λ is the wave length of an outer source light; and φ is the angular range of visual field of the outer light source (such as sun light through a window, light of a lamp on the ceiling) reflected on the light reflection surface (front surface, rear surface, or the like) of the lens array sheet.

However, in the condition of which the conventional lens array lens is used, when the [Formula 1] is satisfied, the [Formula 2] is also satisfied. In other words, λ /(2 Δφ²)≧λ is satisfied.

Next, practical values of the [Formula 2] are obtained. The front surface of the lens array sheet is observed with white light with a wave length in the range of 0.38 μm ≦λ≦0.78 μm as external light. In addition, when the angular radius of the external light source as indoor light or natural light through a window is in the range of 10°≦Δφ≦120°, namely 0.175 [rad]≦Δφ≦2.094 [rad]. Thus, corresponding to Δφ=0.175 [rad] and $\lambda_{max}$=0.78 [μm], the following relation can be obtained.

$$H \geq 12.5 \ [\mu m] > \lambda_{max} = 0.78 \ [\mu m]$$

Each of the width a and the depth b of each cluster member 21 is preferably the same as the height H. However, to maintain the minimum strength of the cluster member 21 as a spacer, each of the width a and the depth b should be 1 μm or greater although they depend on the height H. When each of the width a and the depth b exceeds 125 μm, in particular, 500 μm, the cluster member becomes visible. When the lens array sheet is used for a liquid crystal display device, the moire fringes take place in pixels of the liquid crystal display device.

The cluster members 21 with the above-described size on the lens array sheet are preferably randomly and two-dimensionally distributed. If the cluster members are periodically formed, the cluster members and lens elements (that are periodically formed) formed on the opposite surface thereof are periodically overlaid. Thus, the moiré fringes take place. In addition to the periodical arrangement of the lens elements of the lens array, when the lens array sheet is used for a back light of a color liquid crystal display device, the cluster members interfere with the periodical arrangement of pixels of the display device and thereby moiré fringes tend to take place. Thus, when the cluster members are randomly arranged, the moiré fringes can be prevented from taking place.

However, even if the cluster members 21 are randomly arranged, when the shape of each cluster member 21 is the same and the orientation thereof is the same, since each side surface of the same type of the cluster members faces the same direction, a set of small side surfaces in the same direction form a large virtual side surface. Since the virtual side surface is composed of cluster members that are randomly arranged, they do not have a periodicity. However, since the virtual side surface interferes with the lens elements of the lens array, the moiré fringes take place.

Thus, the structural surface of each lens element and the side surface of each cluster member should have a particular relation.

Figure 4A:
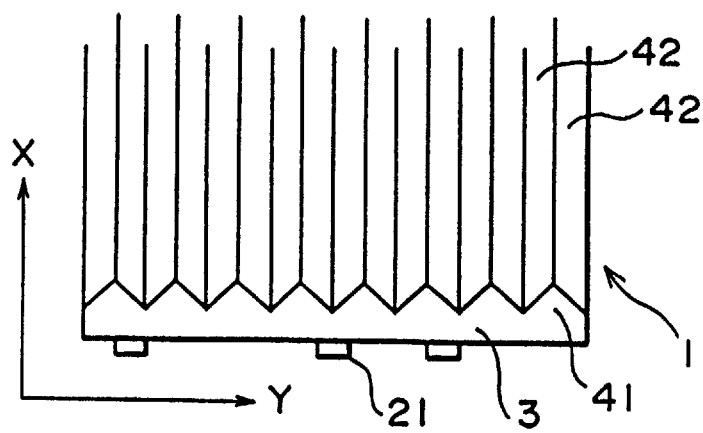
FIGS. 4A and 4B are schematic diagrams for explaining that the side surfaces of the cluster members are not in parallel with the structural surface of the lens array.
Figure 4B:
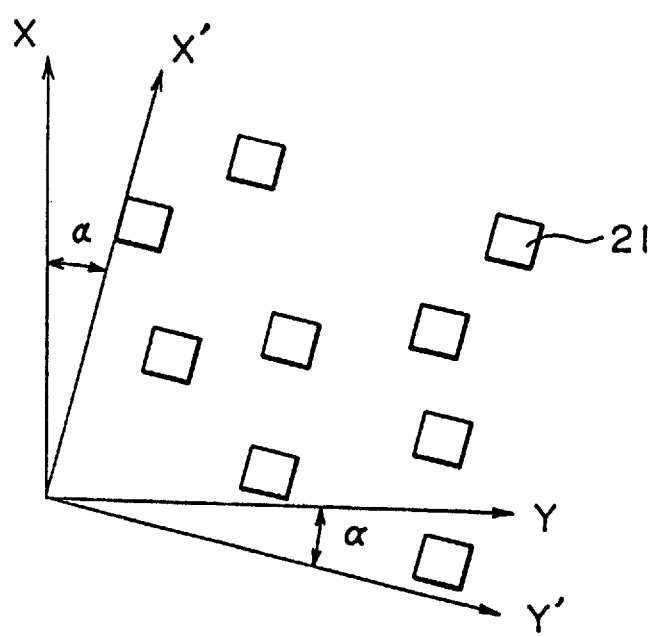

FIGS. 4A and 4B are schematic diagrams for explaining a structure for preventing the moiré fringes from taking place. For example, as shown in FIG. 4A, assume a structure of which the lens array of the lens array sheet 1 is composed of triangular prism lenses as lens elements 41. The light emitting surface of the lens array sheet 1 is in parallel with the X-Y plane. The light emitting surface is referred to as a horizontal surface. The normal direction perpendicular to the light emitting surface is the direction of the axis Z (not shown). The structural surfaces of each lens element 41 are inclined surfaces 42 that form the top and the bottom of a triangular prism. The line of intersection of the inclined surfaces and the horizontal surface is in parallel with the axis X (in this case, the coordinates are defined so that the axis X is in parallel with the line of intersection) Strictly speaking, the inclined surface is a finite surface. The horizontal surface can be defined in various manners depending on the coordinates of the axis Z. The inclined surface does not intersect with the horizontal surface depending on a condition. In this example, the line of intersection represents the line of which the inclined surface is extended and intersected with the horizontal surface. When triangular prisms as lens elements are one-dimensionally arrayed, there is one line of intersection. On the other hand, when quadrangular prisms as lens elements are two-dimensionally arrayed, there may be two or more lines of intersection. In this case, the lines of intersection may be not perpendicular to each other.

FIG. 4B is a schematic diagram showing the case that X-Y coordinates corresponding to the line of intersection of the lens elements 41 of the triangular prisms is overlaid with X'-Y' coordinates corresponding to axis X' of one line of intersection obtained from the cluster 2.

The orientations of the cluster members 21 (formed in a rectangular parallelepiped shape) are arranged. There are two lines of intersection of side surfaces of the cluster members 21 and the horizontal surface of the lens array sheet. The two lines of intersection are perpendicular to each other. They are lines of intersection in parallel with the axis X' and the axis Y'. The axis X' and the axis X form an angle α.

There are many dispersed cluster members. In addition, there are many lines of intersection of the many side surfaces and the horizontal surface of the lens array sheet. However, since the orientations of the cluster members are arranged, in the case of the rectangular parallelepiped shape, there are two lines of intersection that are perpendicular to each other. When the angle α between the axis X and the axis X' is zero, the axis X is in parallel with the axis X'. Thus, the moiré fringes tend to take place. However, when the line of intersection of each lens element has an angle of 5° to the line of intersection of each cluster member, the moiré fringes can be prevented. In other words, in the case of the rectangular parallelepiped shape, when the angle α is in the range from 5° to 85° (in the clockwise direction), more preferably in the range from 10° to 80° (in the clockwise direction), the moiré fringes can be effectively prevented. In addition, the angle α is preferably in the range from −5° to −85° (in the counterclockwise direction), more preferably in the range from −10° to −80° (in the counterclockwise direction). In the case of the rectangular parallelepiped shape, when the angle α exceeds 85°, the angle to the line of intersection of the side surface becomes large. Thus, since the relation between the adjacent side surfaces (90° to the side surface) becomes almost parallel. Consequently, due to the relation with the adjacent side surfaces, the moiré fringes tend to take place. When the side surfaces of the prisms have an angle of 5° to the horizontal direction, the moiré fringes can be prevented.

When the cluster members are composed of for example rectangular parallelepiped members and the angle between the line of intersection of a particular side surface of each rectangular parallelepiped member and the horizontal surface of the lens array sheet and the line of intersection of the surface of each lens element and the horizontal line exceeds 5°, it is not necessary to arrange the orientations of all the cluster members (formed in the rectangular parallelepiped shape). For example, even if 1% of all cluster members are arranged in parallel, when they are not adjacently arranged as a set, the parallel relation of which the moiré fringes take place is not defined.

Thus, in claim 3 of the first aspect of the present invention, "each rectangular parallelepiped member" where the line of intersection of a side surface of each rectangular parallelepiped member is not in parallel with the line of intersection of a lens element does not mean that all rectangular parallelepiped members that are formed do not have a non-parallel relation, but that even if part of rectangular parallelepiped members have a parallel relation, the non-parallel relation takes place as the general situation.

As the shape of each cluster member according to the first aspect of the present invention, a prism shape can be used instead of the rectangular parallelepiped shape. In the above-described rectangular parallelepiped shape, the angle of each adjacent side is 90°. Thus, whenever the rectangular parallelepiped members are rotated for 90°, the same situation takes place. However, in the case of the rectangular parallelepiped shape, since each opposite side surfaces are in parallel, it is necessary to consider two lines of intersection that are perpendicular to each other. However, in the case of the prism shape other than the rectangular parallelepiped shape, for example a triangular prism shape, the number of lines of intersection to be considered is three. In the case of a pentagonal prism shape, the number of lines of intersection to be considered is five. In these cases, the number of lines of intersection to be considered is greater than that in the case of the rectangular parallelepiped shape. Thus, the probability of the occurrence of the moiré fringes increases. Consequently, the degree of freedom of designing the lens array sheet decreases. Even in the case of a free quadrilateral shape where each adjacent side does not form a right angle, the number of lines of intersection to be considered is as many as four. Thus, even if a quadrangular prism shape with a rear surface that has a parallelogram shape or a rhombus shape is used, as with the case of the rectangular parallelepiped shape, the occurrence of the moiré fringes can be prevented However, the cluster members in the rectangular parallelepiped shape is more easily fabricated than those in the quadrangular prism shape with the rear surface having a parallelogram shape or a rhombus shape.

In the case that the lines of intersection of side surfaces are not straight lines, there is an n-side prism (where n is infinite) (namely, a circular cylinder shape or an elliptic cylinder shape where the side surface is a curved surface). In this case, when an original press film for forming cluster members is produced by a horizontal scanning method using a scanner or the like, since the cluster members are very small, the contour of for example a circular shape of side surfaces that are not in parallel with or perpendicular to scanning lines are rugged. Thus, a smooth side surface of the cylinder cannot be obtained.

Figure 5A:
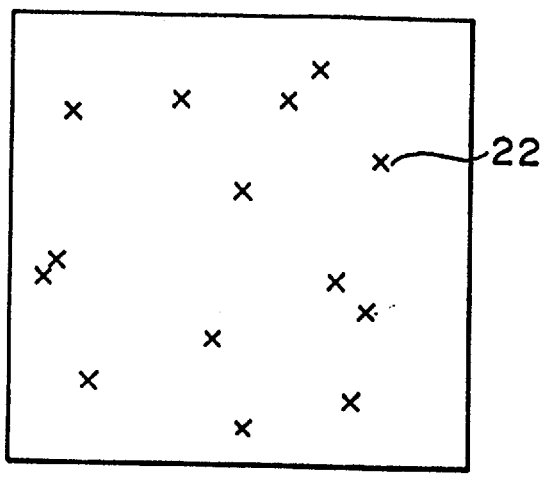
FIGS. 5A, 5B, and 5C are schematic diagrams for explaining a process for randomly forming the cluster members.

As a method for randomly forming cluster members, X-Y coordinates on which cluster members are arranged corresponding to random numbers in an X-Y plane with a predetermined area equivalent to the entire surface of the lens array sheet are generated. In FIG. 5A, reference numeral 22 is a random coordinate point at which a cluster member 21 is arranged.

Figure 5B:
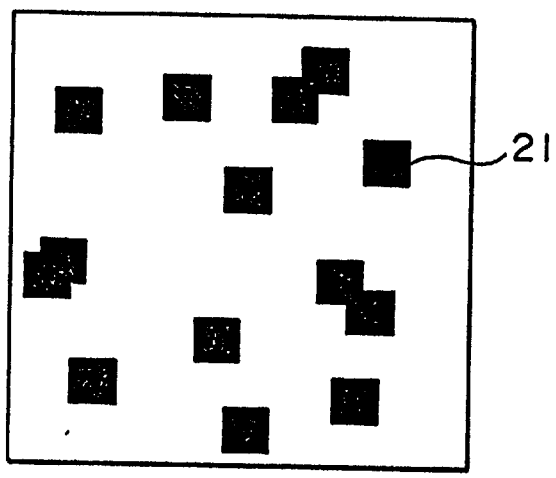
Figure 5C:
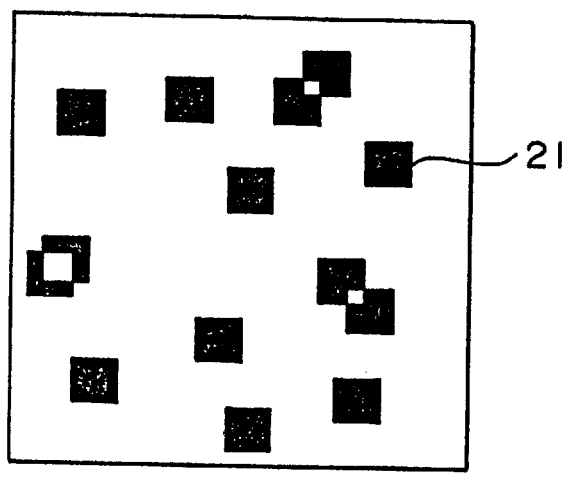
Figure 6A:
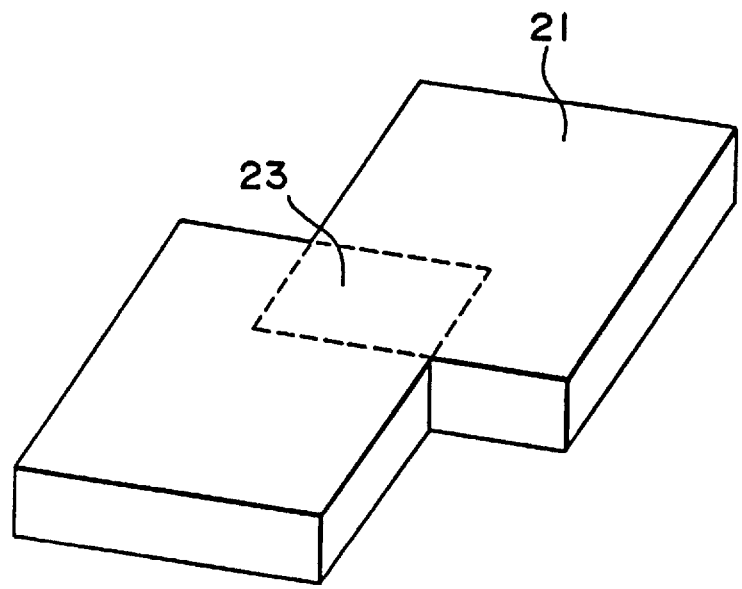
FIGS. 6A and 6B are schematic diagrams for explaining a process for forming cluster members that overlap.
Figure 6B:
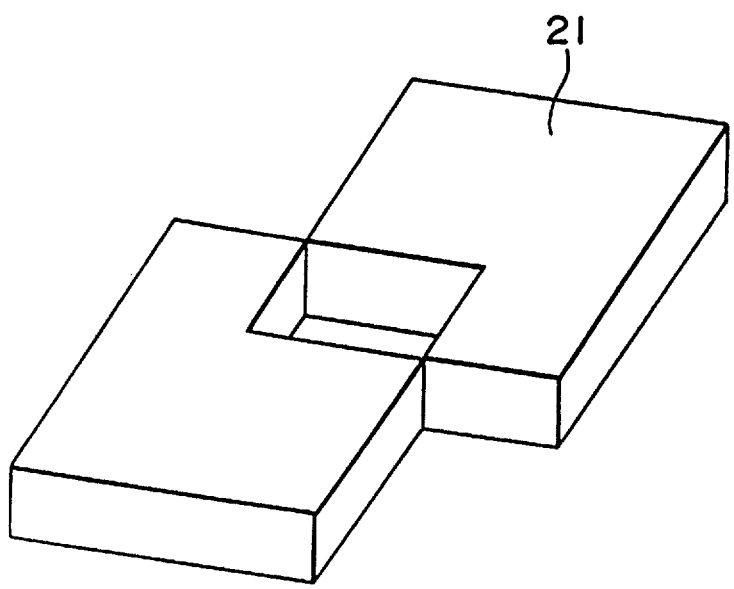

When cluster members 22 with a finite size are adjacently formed in the coordinate points 22, overlap portions 23 of the cluster members 22 may take place as shown in FIG. 6A. In FIG. 6A, dashed lines are virtual lines that represent overlap portions. In this case, since the size of cluster members becomes large and thereby visible. As one method for solving such a problem, as shown in FIG. 6B, the height of the overlap portions of cluster members is preferably zero. Thus, the cluster members can be prevented from overlapping and increasing the area of the top portion thereof. Consequently, even if the cluster members overlap, the size thereof can be prevented from increasing and the cluster members can be prevented from becoming visible FIG. 5B shows the overlap portions. FIG. 5C shows the cluster members in the case that the height H of the overlap portion is zero.

The moiré fringes that take place in the relation between the structural surface of each cluster member and the structural surface of each lens element. In other words, when the cluster members are formed in the same orientation, the side surfaces thereof are arranged. Thus, a line of intersection that can be recognized is defined. This is because the relation between the line of intersection of each cluster member and the line of intersection of each lens element takes place. However, even if the shapes of the cluster members are the same, when they are randomly formed (namely, unlike with the case shown in FIG. 4B, the cluster members are rotated around the axis Z that is perpendicular to the X-Y plane), the line of intersection of a side surface of each cluster member has an angle that is dispersed. Thus, there is no line of intersection defined at a predetermined angle. In such a manner, the occurrence of the moiré fringes can be prevented. However, from a view point of easy fabrication of the lens array sheet, it is preferable to form the cluster members in the same orientation.

In this point, the circular cylinder shape, the elliptic cylinder shape, and the like are superior to the other shapes. However, as described above, the side surface that is a smoothly curved surface is difficult to fabricate. As a countermeasure in the case that adjacent cluster members overlap, when the height H is zero, a sharp sectional shape is formed at a contact portion. This shape causes the fabrication of the lens array sheet to become difficult.

However, instead of using the method of which the height H is zero, when X and Y coordinate values are generated corresponding to random numbers with a quantizing step that is greater than the diameter D of for example a circular cylinder (values smaller than the quantizing step are rounded off), the random coordinate values are always greater than the diameter D. Thus, even if the cluster members are formed at the coordinate points, they do not overlap. As a modification of this method, when the quantizing step is intentionally increased, the minimum distance of each adjacent cluster member can be adjusted.

The distribution density of the cluster members is designated so that the lens array sheet is not bent and thereby the equal-thickness interference fringes do not take place. In addition, even if the lens array sheet has a proper rigidity, a homogeneous distance between the lens array sheet and the optical conductor or between the lens array sheets can be maintained so that a small difference of the distances prevents the equal-thickness interference fringes from taking place.

In the case that two lens array sheets are layered, the distribution density of which the sectional area of each cluster member is zero (namely, the distribution density of the cluster members) is preferably designated to the relation of $t<2p$ (where t is the average distance of adjacent cluster members formed on the rear surface of the upper lens array sheet; and p is the repetitive period of the lens elements formed on the front surface of the lower lens array sheet). Thus, since supporting contacts between the cluster members 21 formed on the rear surface of the upper lens array sheet and the lens elements 41 formed on the front surface of the lower lens array sheet are prevented from being bent, the distance between the upper and lower lens array sheets does not become heterogeneous. Consequently, the equal-thickness interference fringes do not take place. In addition, the distance between the upper and lower lens array sheets can be prevented from becoming smaller than the wave length of the source light. The average distance t is more preferably in the range of $t<0.5p$.

On the other hand, as a distribution density for preventing the equal-thickness interference fringes from taking place even if the lens array sheet bends in the case that the sectional area of each cluster member is finite, the area ratio Sr ($=(Sp/St)\times100$) of the sum of Sp of the sectional areas of the cluster members against the entire area St of which the lens array sheet 1 faces the optical conductor 51 is preferably in the range from around 0.01 to 60%. As the function of spacers, the number of cluster members should be as small as possible. However, to prevent the lens array sheet from bending, a proper number of cluster members are required. When the lens array sheet is used as a surface light source along with an optical conductor (that will be described later), a proper number of cluster members are required to homogenize the surface distribution of the luminance.

Next, the factor of the surface distribution of the luminance will be described using the area ratio R that is the reverse relation of the above-described area ratio Sr.

The area ratio R [%] that is the ratio of the sum Sa of the areas of space portions 9 with a length homogeneous to or greater than the wave length of the source light (the cluster members 21 do not contact the front surface of the optical conductor 51) and the entire area St (the lens array sheet 1 faces the optical conductor 51) is expressed by the following [Formula 3].

$$R'=(Sa/St)\times100 \quad \text{[Formula 3]}$$

Thus, the area ratio R and the area ratio Sr have the relation of R+Sr=100.

The area ratio R depends on the homogeneity of the luminance on the surface to which light is emitted, the using efficiency of the light energy, the size of the optical conductor, and so forth. The area ratio R should be normally 80% or greater, preferably 90% or greater.

Figure 30:
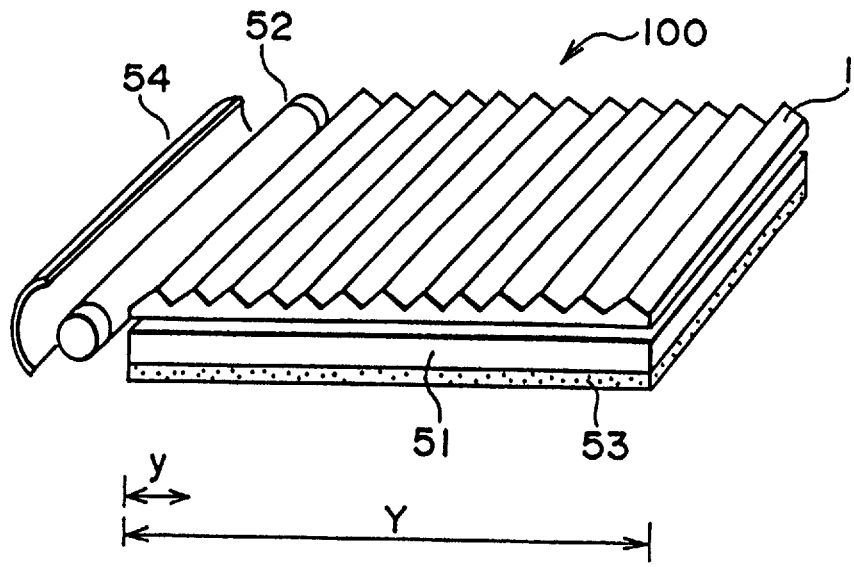
FIG. 30 is a perspective view showing an edge light type surface light source according to an embodiment of the first to third aspects of the present invention.

As the reason, when the smooth front surface 55 of the optical conductor is contacted with the front surface (the rear surface) of the lens array sheet 1 in the case that the surface roughness of both the optical conductor 55 and the lens array sheet 1 are homogeneous to or smaller than the wave length of the source light, as shown in FIG. 30, most of light entered from the light source 52 to the optical conductor 51 are not totally reflected in a region from the side edge portion of the light source side to the distance y, but emitted (even if the light is entered into the front surface of the optical conductor with an incident angle homogeneous to or greater than the critical angle, the light is not totally reflected, but emitted to the lens element). Thus, at a position spaced apart from the light source by greater than the distance y, the luminance remarkably decreases and becomes dirk.

Experimental results show that the percentage of the distance y of the light emitting portion to the entire length Y in the light propagating direction is in the range from 10 to 20%.

Thus, to homogeneously distribute the light energy entered from the light source to the optical conductor in the entire length Y, since most of light (approximately 100%) is emitted at the region of the length y of the front surface 55 of the optical conductor, 10 to 20% of the incident light of the region of the length y should be emitted and the rest of the incident light (namely, 90 to 80% of the light) should be totally reflected.

Since the following relation is satisfied (amount of totally reflected light/amount of entire incident light) ≈ Sa/St=R thus, R should be 80 to 90% (Sr=10 to 20%)

Since the similar approximation can be performed at a position farther than y, the condition of which R should be in the range of 80 to 90% can be applied to the entire length. However, when R becomes almost 100% (namely, Sr becomes almost 0%), as described above, since the lens array sheet is bent, the distance of each cluster member cannot be maintained to homogeneous to or greater than the wave length of the source light. Thus, the upper limit of R is preferably 99.99% or smaller (namely, Sr≧0.01%).

When the above-described cluster members are formed on one surface of the lens array sheet, light that is emitted out of the angular range of visual field is not increased and thereby the luminance is not decreased. In addition, the equal-thickness interference fringes and the moiré fringes can be prevented. Thus, the lens array sheet can homogeneously distribute light on the entire surface of the optical conductor with a homogeneous surface distribution.

Next, with reference to FIG. 7, a lens array sheet according to a second aspect of the present invention will be described. The second aspect of the present invention features the random two-dimensional distribution of the first aspect of the present invention is a distribution of which the positions of lattice points of a two-dimensional periodic lattice are randomly moved and reallocated. For simplicity, redundant description is omitted. Only portions peculiar to the second aspect of the present invention will be described.

As a method for randomly forming cluster members, X and Y coordinates for the cluster members may be generated on the X-Y plane with a predetermined area equivalent to the entire surface of the lens array sheet corresponding to random numbers. In this case, distribution errors that are visible may take place in the distribution of coordinate points.

To solve such a problem, in the lens array sheet according to the second aspect of the present invention, coordinate points at which the cluster members are formed are generated corresponding to a predetermined rule. Regardless of the number of cluster members, they are randomly distributed with a homogeneous surface density of cluster members without a deviation.

In other words, according to the second aspect of the present invention, coordinate points at which cluster members are formed are not randomly generated. Instead, coordinate points are regularly and homogeneously generated (periodically generated), and then the coordinate points are randomly moved and reallocated. Thus, the coordinate points are randomly generated. Consequently, the number of cluster members in a predetermined area (namely, the surface density of cluster members) depends on the number of cluster members that have been regularly generated.

Figure 7A:
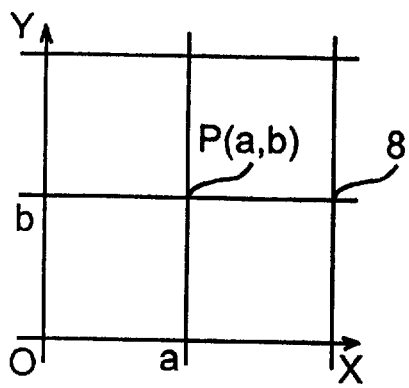
FIGS. 7A, 7B, 7C, 7D, and 7E are schematic diagrams for explaining a two-dimensional lattice and a randomized cluster corresponding to the second aspect of the present invention.
Figure 7B:
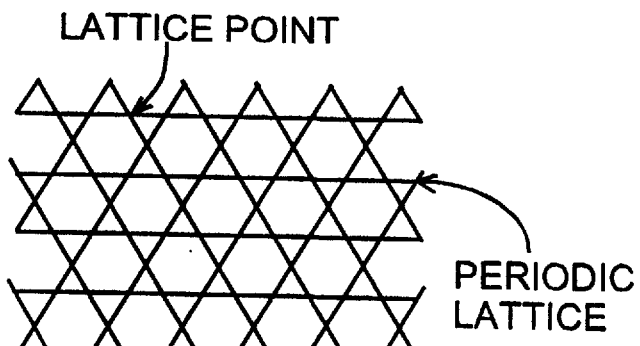
Figure 7C:
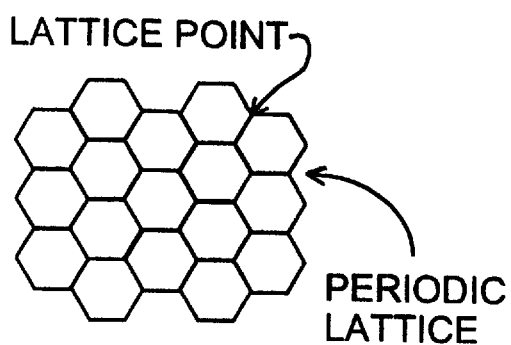

The coordinate points regularly and homogeneously generated are obtained corresponding to periodic lattice points 8 of two-dimensional periodic lattices as shown in FIGS. 7A to 7C. A two-dimensional lattice is composed of lattice elements that are adjacently, periodically, and two-dimensionally arranged. Next, lattice elements of the two-dimensional lattices will be described. FIG. 7A shows a square lattice of which the lattice constant a on the axis X and the lattice constant b on the axis Y are the same on an orthogonal coordinate system. As another two-dimensional lattice, the lattice length a and the lattice length b of each lattice element are not the same. As another two-dimensional lattice, the coordinate axes are not perpendicular to each other. These two-dimensional lattices are referred to as parallelogram lattices. FIG. 7B shows a basket-weave-shape lattice. FIG. 7C shows a hexagonal lattice.

Next, a method for randomly moving and reallocating the lattice points of an above-described two-dimensional lattice will be exemplified. For example, in the two-dimensional lattice shown in FIG. 7A, the X coordinate Px and the Y coordinate Py of the coordinates P (Px, Py) of each lattice point can be expressed by the following [Formula 4.1]. The coordinates R (Rx, Ry) of a new lattice point that has been randomized can be expressed by the following [Formula 4.2] and [Formula 4.3].

$$Px=a\times n, Py=b\times m \quad \text{[Formula 4.1]}$$

$$Rx=a\times n+\alpha\times RND \quad \text{[Formula 4.2]}$$

$$Ry=b\times m+\beta\times RND \quad \text{[Formula 4.3]}$$

where a is the length of the lattice element on the axis X; b is the length of the lattice element on the axis Y; n and m are any positive or negative integer including zero; RND is a random function for generating a uniform random number in the range from −0.5 to +0.5; and α and β are coefficients multiplied by the obtained random number. Alternatively, the random number may be in the range from 0 to 1. Thereafter, when 0.5 is subtracted from the resultant random number, the same result is obtained.

Figure 7D:
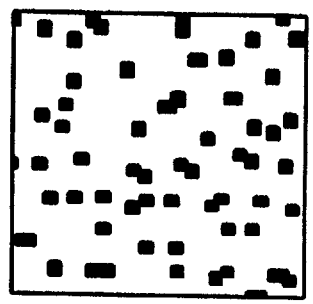
Figure 7E:
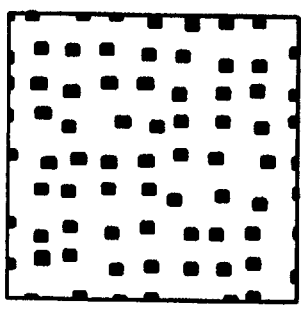

When α and β are smaller than a and b, respectively, lattice points that have been randomized are reallocated in the vicinity of the original lattice points. When α and β approach zero, the randomized lattice points are asymptotically converged to the original lattice points and thereby the random characteristic is asymptotically converged. On the other hand, when α and β are greater than a and b, respectively, the regularity of the original lattice points degrades. Thus, when α and β are proper values to a and b, respectively, random coordinate points with both regularity and randomness can be obtained. FIG. 7D shows randomized lattice points in the case that α=1.4a and β is 1.4b. FIG. 7E shows randomized lattice points in the case that α=0.4a and β=0.4b. In FIGS. 7D and 7E, cluster members 2 formed at randomized coordinate points in a square are shown.

When cluster elements are formed at randomized lattice points, for example the center of each cluster member with a finite area as its representative coordinates can be positioned at a lattice point. Thus, all cluster members should be formed at representative coordinates of individual lattice points corresponding to the same definition. Otherwise, a new element is added to the coordinates of the randomized lattice points. Thus, unless a special condition is added, the randomness cannot be maintained. The size of the rear surface (namely, the bottom area) of each cluster member should be designated so that it satisfies an area ratio R (that will be described later).

The above-described randomizing process can be performed by for example a computer. The calculated result is printed on an original press film. Alternatively, a block of cluster members that have been randomized can be repeatedly formed in vertical and horizontal directions so as to form cluster members with a required area. This process can be accomplished by a known printing method.

The distribution density of the cluster members should be designated so that the lens array sheet does not bend and thereby the equal-thickness interference fringes do not take place. In addition, even if the lens array sheet has a rigidity to some extent, the distribution density of the cluster members should be designated so that the distance between the optical conductor and the lens array sheet or between two lens array sheet can be homogeneously kept and thereby the equal-thickness interference fringes do not take place. Thus, the size of each lattice element of the two-dimensional lattice can be designated corresponding to the distribution density.

As described above, according to the second aspect of the preset invention, since the predetermined cluster members are formed on one surface of the lens array sheet, the equal-thickness interference fringes and moiré fringes can be prevented without tradeoffs of increase of the amount of light that is emitted out of the angular range of visual field and decrease of the luminance. In addition, a lens array sheet that can homogeneously distribute light on the entire front surface of the optical conductor.

Next, with reference to FIGS. 8 to 20, a lens array sheet according to a third aspect of the present invention will be described. For simplicity, redundant description is omitted.

Figure 8:
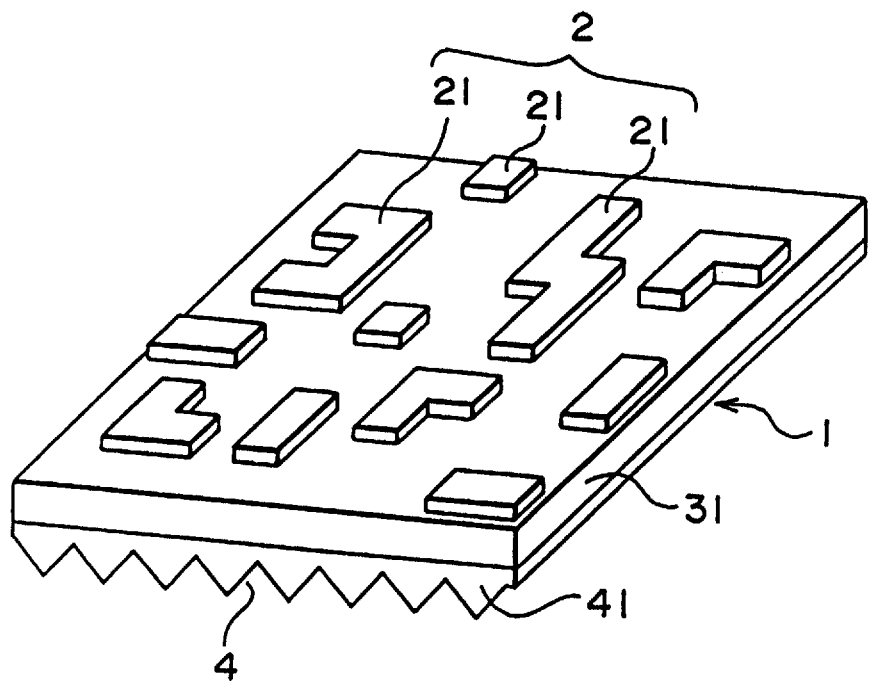
FIG. 8 is a perspective view showing a lens array sheet according to a third aspect of the present invention.

FIG. 8 is a perspective view showing a lens array sheet according to an embodiment of the third aspect of the present invention. A lens array sheet 1 according to the third aspect of the present invention shown in FIG. 8 is composed of a transparent substrate sheet 31, a lens array 4, and a cluster 2. The lens array 4 is composed of a large number of triangular prisms as lens elements 41 that are adjacently and one-dimensionally formed on a first surface of the transparent substrate sheet 31 so that the edge lines of the lens elements 41 are arranged in parallel. The cluster 2 is composed of a large number of cluster members 21 that are formed in a rectangular parallelepiped shape and randomly and two-dimensionally formed on the entire second surface of the transparent substrate sheet 31. In FIG. 8, the cluster 2 is formed on the second surface (front surface) for convenience.

The lens array sheet according to the third aspect of the present invention features a cluster formed on the opposite surface of the lens array. The cluster is composed of a large number of cluster members that are separately formed with different shapes. Each of cluster members is composed of at least one cluster member element that is formed in a prism shape or a prismoid shape and whose minimum diagonal length of the front surface and rear surface is homogeneous to or greater than the wave length of the source light and whose maximum diagonal length thereof is 500 μm or smaller. At least one cluster member element is fused. The fusing of cluster member elements is performed by connecting adjacent cluster member elements. To obtain cluster members from cluster member elements, in the third aspect of the present invention, a special method is used. In other words, in the third aspect of the present invention, cluster members are formed of cluster member elements corresponding to the theory of percolation. In this theory, cluster member elements are disposed at lattice points of a two-dimensional lattice such as a square lattice with a predetermined probability (that is referred to as an occupying probability P or percolation probability P). Cluster member elements disposed at adjacent lattice points are connected and thereby a plurality of cluster members are formed. When there are no adjacent cluster member elements, each cluster member element is treated as a cluster member. In addition, as will be described later, cluster members are disposed out of lattice points.

Next, the method for obtaining cluster members corresponding to the theory of percolation will be described.

First, the theory of percolation will be described. There are two types of randomness (see "Percolation" in *Fractal*, Chapter 9, written by J. Feder, translated by Mitsugu Matsushita, et. al, published by Keigaku Syuppan on May 31, 1991). The first type is known as a diffusion phenomenon that is randomness of particles that move in a medium. The second type is randomness of particles that move in a medium corresponding to the randomness thereof. The latter randomness is named percolation process by Hammersley because the particles move as with coffee in a percolator. A real example of the latter randomness is the penetration of water in a crack of a rock or a stone. In addition, a burning process of a fire is explained with such a model in "Propagation of fire and percolation model" in *SUURIKAGAKU*, by Motoo Hori, pp 63–70, June 1974.

J. Feder explains the concept of the percolation with a two-dimensional penetration on a square lattice. In this case, the lattice points of the square lattice are randomly occupied with particular substances (for example, cluster member elements in the third aspect of the present invention) at a occupying probability P (this is called percolation probability). In this case, assumed that "particular substances" are small holes in a rock or a stone. In addition, assume that adjacent holes are connected with a pipe. (In this case, a small hole is referred to as a site. A set of connected sites is referred to as a cluster. A pipe that connects sites is referred to as a bond.) Thus, water poured to a particular hole penetrates to a small hole that is connected to the particular hole. In other words, water poured to a small hole that composes a particular cluster stays in the cluster, not further penetrates. The number of sites that compose one cluster is referred to as the size of the cluster. However, when the occupying probability P exceeds a predetermined critical value, an infinite cluster that is a set of small holes takes place. Water poured to a small hole of the infinite cluster penetrates to the entire lattice. Such a cluster is referred to as a penetrate cluster. The occupying probability of which the percolation cluster takes place at first is referred to as a critical percolation concentration Pc (or a critical probability). In the case of a square lattice, Pc ≈0.593.

In the above-described example, when lattice points are occupied with a predetermined probability and the occupied lattice points are adjacent, they are connected with pipes. A model represented only with the occupying probability of the lattice points is referred to as a site percolation. A model represented with the probability of which a connected pipe is open (not closed) is referred to as a bond percolation. In addition, a model represented with both the probability of site and the probability of bond is referred to as a mixed percolation. In the technical paper written by Motoo Horii, the propagation of a fire is evaluated with such percolation models. As an example of the bond percolation, a phenomenon of which a fire of a wooden house in a thickly housed area is extended to an adjacent house depends on the bond probability. In addition, the value of the concentration Pc of the critical percolation is used for the site percolation of the square lattice. The value of the concentration Pc of the bond percolation is ½.

Next, the relation between the cluster member elements and the cluster members according to the third aspect of the present invention will be described corresponding to the explanation of the clusters of the above-described percolation models.

In the site percolation of the square lattice, when lattice points of the square lattice are viewed from the obtained cluster, lattice points that compose the cluster have small holes. Lattice points that do not compose the cluster do not have small holes. Thus, in the third aspect of the present invention, lattice points that compose a cluster (namely, lattice points in a cluster) are referred to as cluster structural elements. Consequently, lattice points that do not have small points (namely, lattice points outside the cluster) are not referred to as cluster structural elements.. In other words, lattice points are alternatives of which substances can be designated with a predetermined probability. Cluster structural elements are alternatives to which substances are always designated.

In the site percolation, occupied lattice points are sites. A cluster is obtained by connecting adjacent "sites occupied with particular substances" with bonds. This definition can apply to the bond percolation and the mixed percolation. In the bond percolation, a cluster is obtained by connecting "bonds occupied with particular substances" with sites. In the mixed percolation, assuming that all bonds are not connected, but part of bonds are connected with a predetermined probability, although a percolation cluster hardly takes place, a cluster can take place.

Thus, in the bond percolation, a cluster is composed of particular (for example, occupied) bonds. In the mixed percolation, a cluster is composed of particular sites or bonds. In addition, a cluster is not limited to the site percolation model. According to the third aspect of the present invention, cluster structural elements are sites, bonds, or the both regardless of the site percolation model, the bond percolation model, or the mixed percolation model.

However, in the following description, a cluster in the site percolation model will be exemplified. In the third aspect of the present invention, cluster members are obtained by connecting a plurality of cluster member elements. Thus, the site percolation model, where cluster member elements are disposed at lattice points with a predetermined probability, is intuitively understandable. In addition, logically, it has been proved that the bond percolation model is equivalent to the site percolation model (where the center of each bond is placed at a lattice point (this lattice is referred to as a coated lattice)) (see "Science of Percolation (translated title)", by Takashi Odagaki, Chapter 1, Syokabo, Jun. 20, 1993).

A typical example of a two-dimensional lattice is a square lattice. However, the two-dimensional lattice is not limited to the square lattice. Normally, a two-dimensional lattice is a lattice with a regularity where lattice elements are periodically and two-dimensionally formed. Examples of the two-dimensional lattices are a square lattice, a triangular lattice, a basket-weave-shape lattice (see FIG. 14A), a hexagonal lattice (hive) (see FIG. 14B), and a Penrose lattice. A square lattice is composed of square lattice elements where the lattice length on the axis X is homogeneous to the lattice length on the axis Y in the orthogonal coordinate system. Instead of the square lattice, a parallelogram lattice or the like where the lattice length on the axis X is not homogeneous to the lattice length on the axis Y or where the coordinate axes are not perpendicular to each other (namely, an oblique coordinate system) may be used. Alternatively, lattices with irregular lattice elements may be used.

The critical percolation concentration Pc in the site percolation model of each of major two-dimensional lattices is as follows.

Hive lattice : 0.6962

Square lattice : 0.592745

Basket-weave-shape lattice 0.65271

Triangular lattice : 0.5

Penrose lattice : 0.584

Although the shape of the cluster is random, it is normally fractal.

A cluster member element that is occupied at a lattice point with a predetermined probability is formed in a prism shape or a prismoid shape. The rear surface of the cluster member element is formed in a polygon shape that is for example a triangle shape, a quadrilateral shape, or a hexagon shape. Examples of the quadrilateral shape are a rectangle shape, a square shape, and a rhombus shape. The cluster composed of quadrangular prisms formed in a rectangular parallelepiped shape where two opposite sides composing side surfaces thereof are in parallel with each other and adjacent side surfaces are perpendicular to each other and formed in a rectangle shape or a square shape can be easily fabricated.

The shape of the side surfaces of the cluster member elements that are also the side surfaces of the cluster members is not limited to a prism shape. Instead, the shape may be a prismoid shape due to easy fabrication.

The shape of the rear surface of the prism member or prismoid member normally should accord with the shape of the two-dimensional lattice of a percolation process (that will be described later) due to symmetry. In other words, when the two-dimensional lattice is a square lattice, the bottom shape is rectangular. When the two-dimensional lattice is a triangular lattice, the bottom shape is triangular. When the two-dimensional lattice is a hexagonal lattice, the bottom shape is hexagonal. However, the bottom shape is not limited to such shapes.

The minimum element of the cluster is an independent structural element. One minimum cluster member is formed by allocating one cluster member element to one structural element.

Figure 9:
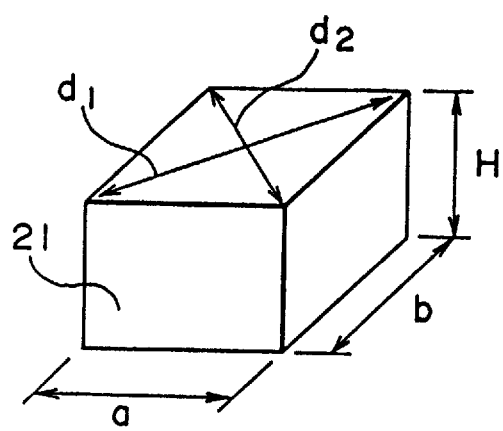
FIG. 9 is a perspective view showing an example of a prism shape cluster member of the lens array sheet according to the third aspect of the present invention.

FIG. 9 is a schematic diagram showing a rectangular parallelepiped shape as an example of the shape of the cluster member element 24. As the definition of the rectangular parallelepiped shape, the relation of the height H, the width a, and the depth b may be either a=b=H (cubic), a=b≠H, a≠b=H, a=H≠b, or a≠b≠H≠a. In a rectangular parallelepiped shape, diagonal lines d1 and d2 on the front surface are the same as those on the rear surface (not shown). The size of each cluster member elements is preferably in a predetermined range corresponding to the height H and the diagonal line d. The size of each of cluster member elements allocated to a plurality of structural elements (in this example, lattice points) are normally the same.

Figure 10:
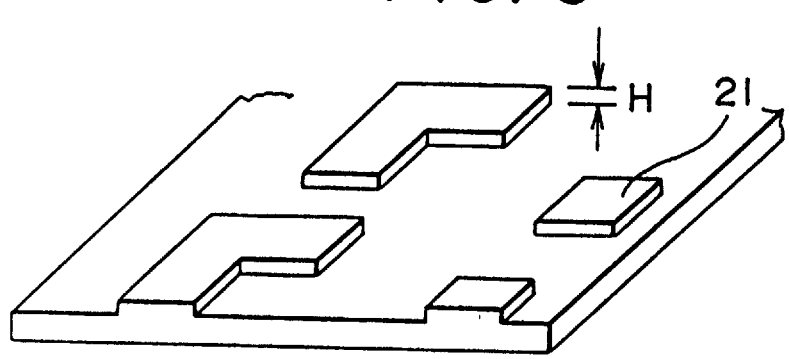
FIG. 10 is a perspective view for explaining a perpendicular parallelepiped shape as a prism that composes a cluster member.

The height H of a cluster member element is also the height of a cluster member composed thereof. As shown in FIG. 10, when a lens array sheet is disposed, the cluster member elements function as spacers with another lens array sheet or a light emitting surface of an optical conductor. The height H of all the cluster members distributed on the entire surface of the lens array sheet is preferably the same so that the lens array sheet does not bend and thereby Newton rings do not take place. Thus, the height H of the cluster member elements disposed at lattice points are also preferably the same. Thus, the height H of the cluster member elements disposed at the lattice points should be the same.

The size of the cluster member elements has an optimum range depending on the wave length of the source light and the visible size of substances. As factors of the size of the cluster member elements, the height H, the width a, and the depth b are used. However, in this case, the cluster member elements are evaluated with the height H and the length of the diagonal line d. As the diagonal line, the minimum diagonal line and the maximum diagonal line of the front surface and the rear surface (in the case of the prismoid shape, the diagonal line of the front surface is different from the diagonal line of the rear surface) are evaluated.

Each of the height H and the length of the minimum diagonal line d is preferably homogeneous to or greater than the wave length of the source light. In addition, each of the height H and the length of the maximum diagonal line d is preferably homogeneous to or smaller than 500 $\mu$m, more preferably homogeneous to or smaller than 125 $\mu$m. When the source light has a spectrum distribution, each of the height H and the length of the minimum diagonal line d is homogeneous to or greater than the maximum wave length of the spectrum of the visible light.

When each of the height H and the length of the diagonal line d is smaller than the wave length of the light, the occurrence of the equal-thickness interference fringes or the unification due to the optical contact of the lens array sheet and the optical conductor cannot be effectively prevented. On the other hand, when each of the height H and the length of the diagonal line d exceeds 500 $\mu$m, the lens array sheet tends to bent and deform or the moiré fringes tend to take place between cluster members and pixels of the display device. Alternatively, the fabrication of the lens array sheet becomes difficult. As a result, it is no meaning to increase the size of the cluster members.

Next, the length of the diagonal line of the cluster member elements will be described. The minimum element of the cluster member 21 is a cluster member element. Thus, as the size of the top and rear surfaces of the cluster member elements, the length of the diagonal line d should be homogeneous to or greater than the wave length of the light source so as to maintain the minimum strength as spacers. However, the length of the diagonal line d is preferably 1 $\mu$m or greater. When the length of the diagonal line d exceeds 125 $\mu$m, in particular, 500 $\mu$m, the cluster members or cluster becomes visible. Thus, the moiré fringes tend to take place between cluster members and pixels of a liquid crystal display device.

In addition, since cluster members are formed by fusing and connecting a plurality of cluster member elements, when the straight portion of the side surface of the fused cluster members is excessively large, they become visible although they depend on the regularity of the two-dimensional lattice, the number of fused cluster member elements, the complexity of the shape of the cluster member elements, the fusing method, and the complexity of the shape of the fused cluster members. Thus, the length of the straight portion is preferably homogeneous to or smaller than 1000 $\mu$m. However, the shape of cluster members that are formed by fusing and connecting cluster member elements is at random. Thus, even if one cluster member has a very long straight portion on a side surface portion, it is not remarkable because other cluster members do not have such straight portions. When the two-dimensional lattice type, the occupying probability, the shape of cluster members, and the fusing method of the cluster members are properly selected, cluster members in a desired shape can be obtained from the cluster member elements.

The cluster member elements that are allocated to lattice points should not have the same shape and the same size. Even if the shape and size of the cluster member elements are varied (for example, the cluster member elements have the same shape, but three different sizes), as long as a two-dimensional lattice with a regularity is used, the occurrences of cluster members with a long straight portion can be reduced.

As a quantity for evaluating the spreading amount of the cluster, an average rotating radium Rs can be used as defined in the following [Formula 5].

$$Rs = \sqrt{\sum_i (|r_i - r_o|^2/s)} \qquad \text{[Formula 5]}$$

where $r_o$ is the center-of-gravity position vector of a cluster; $r_i$ is the position vector of each site of the cluster; s is the size of the cluster; and Rs is the root of the average of the square of the distance from the center of gravity of the cluster to each site of the cluster. Rs is preferably in the range of $d \leq Rs < 3$ [mm]. Although the lower limit is obvious, the upper limit is designated corresponding to the visible effect due to the optical contact. Otherwise, the equal-thickness interference fringes take place and the heterogeneity of the surface distribution of the output luminance becomes remarkable.

Next, a real example for forming cluster members from cluster member elements in a rectangular parallelepiped shape with a square rear surface corresponding to the theory of percolation will be described with reference to FIGS. 12A and 12B.

Figure 12A:
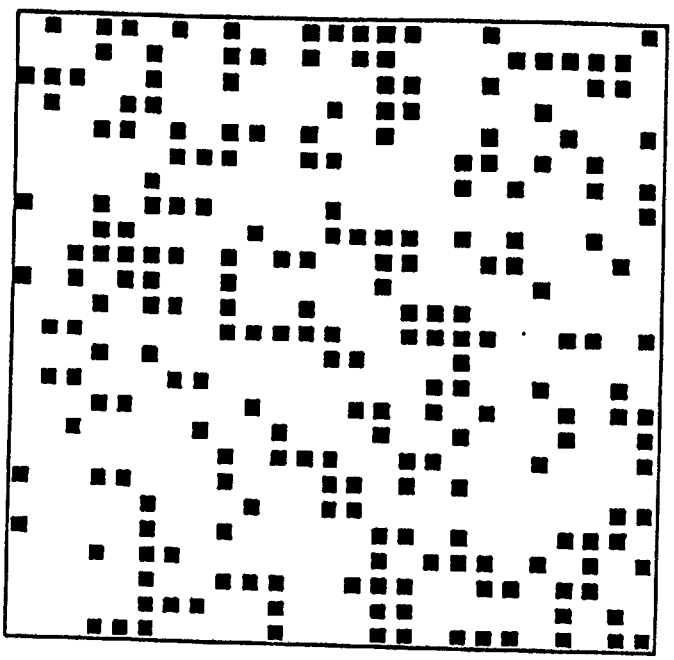
FIGS. 12A and 12B are schematic diagrams for explaining cluster members formed corresponding to the percolation of a two-dimensional lattice, FIG. 12A showing cluster members occupied in squares of the lattice points of the two-dimensional lattice with a predetermined occupying probability, FIG. 12B showing a cluster generated by connecting vertically and horizontally adjacent squares shown in FIG. 12A.
Figure 12B:
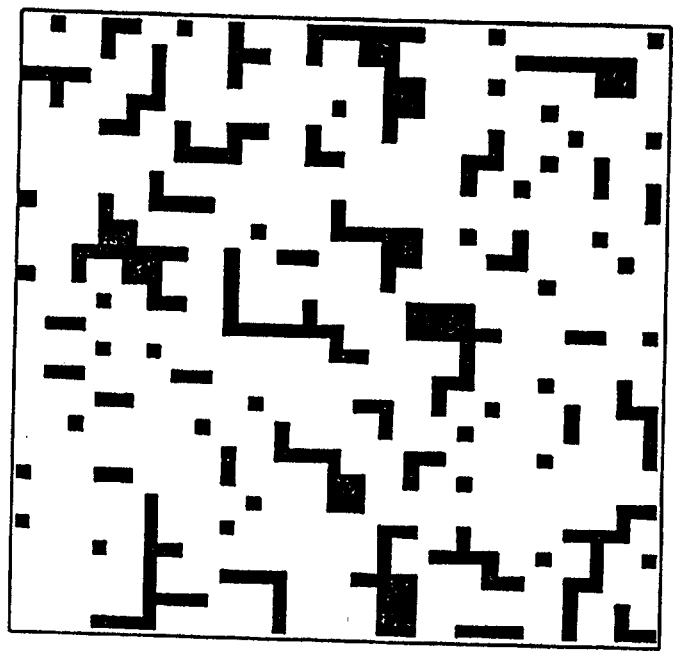

FIG. 12A shows the case that cluster member elements 24 are allocated to lattice points (structural elements) of a 25×25 square lattice. The lattice points are selected with an occupying probability P=0.4. In FIG. 12A, black squares represent cluster member elements. The area of the rear surface of each cluster member element is ⅝ of that of each lattice element of the square lattice. Adjacent cluster member elements (connected with bonds) are fused by filling the gap therebetween. In addition, for adjacent four cluster member elements that form a square, a portion that surrounds the square is filled. Thus, as shown in FIGS. 12A and 12B, cluster members 21 of which cluster member elements have been fused are obtained.

Figure 15:
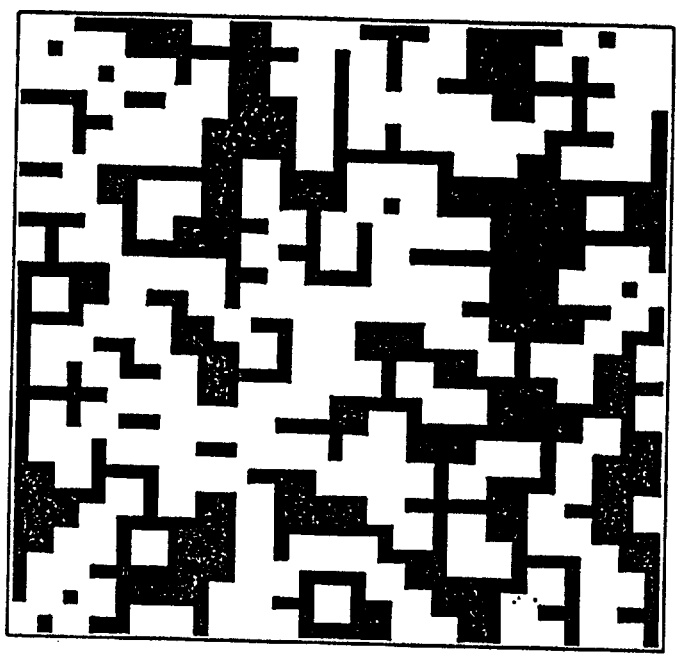
FIG. 15 is a schematic diagram showing a cluster in the case that an occupying probability P exceeds a critical percolation concentration Pc.

In this case, the occupying probability P is preferably smaller than the critical percolation concentration Pc. When P≧Pc, a percolation cluster takes place as shown in FIG. 15. In FIG. 15, with P=0.60 that is the same condition as that shown in FIG. 12, a percolation cluster 21 that extend from the upper side to the lower side takes place. In the third aspect of the present invention, when the occupying probability P exceeds the critical percolation concentration Pc, since the size of the cluster (that connects the end-to-end of the lattice although the size of the cluster is finite), the cluster tends to become visible. In addition, the area of the optical contact between the lens array sheet and the optical conductor or between the lens array sheets (the contact with a space whose length is homogeneous to or smaller than the wave length of the source light) cannot be ignored. Thus, the equal-thickness interference fringes become visible and the homogeneity of the surface distribution of the output luminance of the optical conductor degrades. Thus, according to the third aspect of the present invention, the occupying probability P is selected so that the relation of P<Pc is satisfied.

In addition, as the lower limit of the occupying probability P, a finite value that is not zero is required. To accomplish the function as spacers on the entire surface of the lens array sheet, although the occupying probability P varies corresponding to the size of the cluster member elements, the relation of P≧0.2 should be satisfied.

In reality, the value of the occupying probability P is designated corresponding to the size of the cluster member elements (normally, the length of the diagonal line on the rear surface; or the width a and the depth b when the cluster member elements are formed in a rectangular parallelepiped shape), the lattice constant, and the bending characteristic of the lens array sheet. FIGS. 16 to 20 show examples of computer simulations using uniform random numbers in the case that the lattice constant of a square lattice is 100 μm and the occupying probability P is 0.2, 0.3, 0.4, 0.5, and 0.6. For simplicity, in FIGS. 16 to 20, only a 25×25 lattice points of the entire lattice are shown. In the range of 0.2≦P≦0.5, the maximum value $Rs^{max}$ of the average rotating radius Rs is in the range from 110 μm to 630 μm. The area ratio Sr of the cluster members is in the range from 18 to 54%. Thus, $Rs^{max}$ is in the preferable range. In addition, Sr is also in a preferable range that will be described later.

Figure 13A:
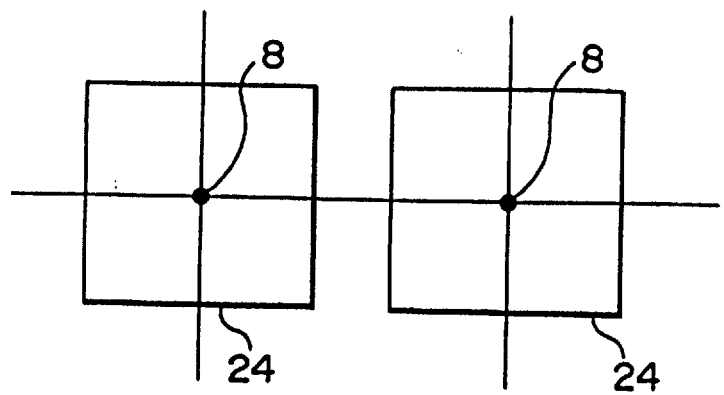
FIGS. 13A, 13B, and 13C are schematic diagrams for explaining the fusing of the cluster members.
Figure 13B:
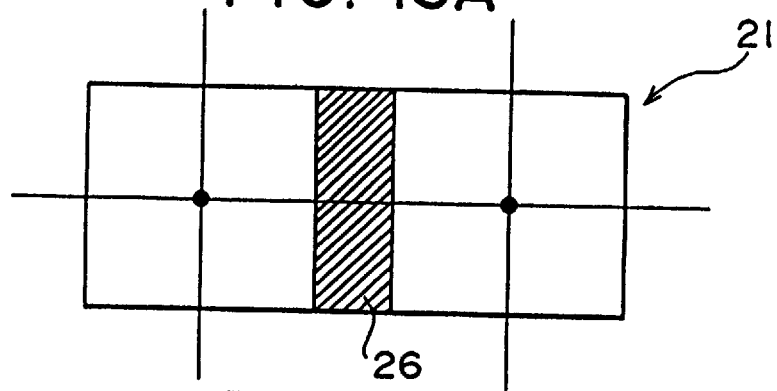
Figure 13C:
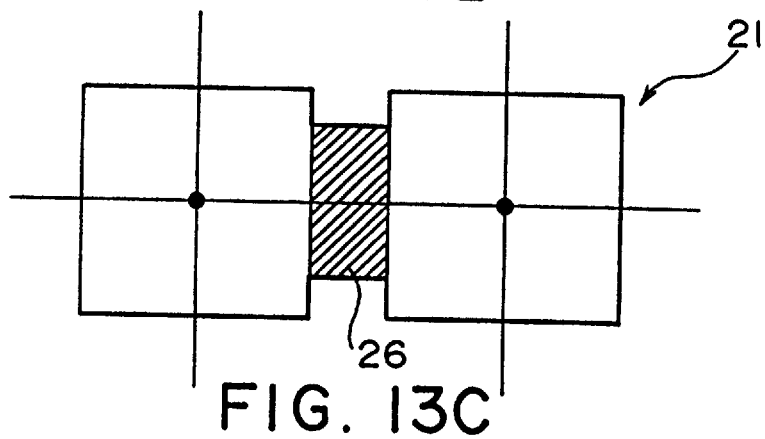
Figure 14A:
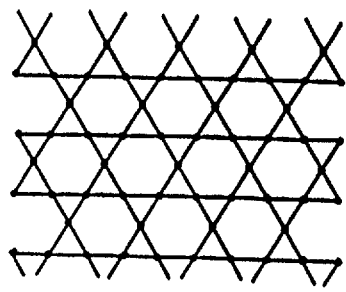
FIGS. 14A and 14B are schematic diagrams showing examples of two-dimensional lattices, FIG. 14A showing a basket-weave-shape lattice, FIG. 14B showing a hexagonal lattice.
Figure 14B:
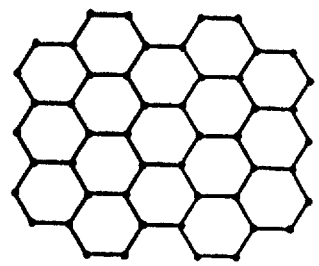

FIGS. 13A, 13B, and 13C show examples for fusing cluster member elements. FIG. 13A shows the case that the rear surface allocated to each lattice point 8 (namely, each structural element) selected with a predetermined occupying probability P is formed in a square shape and cluster member elements 24 are adjacently disposed, each of which is smaller than the length of a lattice element of a square lattice. FIG. 13B shows the case that the shape of a connecting portion 26 of the adjacent cluster member elements is smooth and linear. The cluster member elements in FIG. 12B are fused by the method shown in FIG. 13B. FIG. 13C shows the case that the width of the connecting portion 26 is smaller than that of each of the cluster member elements. In this case, even if the cluster member elements are successively fused, the side surface of the cluster member elements is prevented from becoming linearly long. Thus, the moiré fringes can be more prevented than the case shown in FIG. 13B. However, in the case shown in FIG. 13C, since the shape is complicated, higher machining accuracy is required than the case shown in FIG. 13B.

The two-dimensional distribution of the cluster members 21 on the lens array sheet is preferably a random distribution. In the third aspect of the present invention, the cluster members 21 have randomness corresponding to the theory of percolation (it is clear from the distribution in the case that the center of gravity of an area element on the rear surface of each cluster member is treated as a representative value of the coordinates). If cluster members are periodically formed, since they periodically overlap with lens elements on the opposite surface of the lens array sheet (in most cases, the lens elements are periodically formed), the moiré fringes take place. In addition, when the lens array sheet is used for a back light of a color liquid crystal display device, the cluster members interfere with the placement period of pixels of the display device. Thus, the moiré fringes tend to take place. To solve such a problem, when the cluster members are randomly formed, the occurrence of the moiré fringes can be prevented.

However, even if the cluster members 21 are randomly formed, when the shape of each cluster member element that composes a cluster member is the same and the orientation thereof is the same, since the side surfaces of the cluster members composed of the side surfaces of the cluster member elements are oriented in the same direction, a set of small side surfaces in the same direction virtually forms a large side surface. Even if the cluster members are randomly formed, when a periodical lattice (for example, a square lattice) is used as a two-dimensional lattice and the shape and size of each of cluster member elements disposed at each lattice point are the same, periodicity takes place. The virtual side surface interferes with the surface having the lens elements that compose the lens array and thereby the moiré fringes may take place. Thus, it is preferable to designate a particular relation between the surface that composes the lens elements and the side surface that has the cluster members.

Figure 11A:
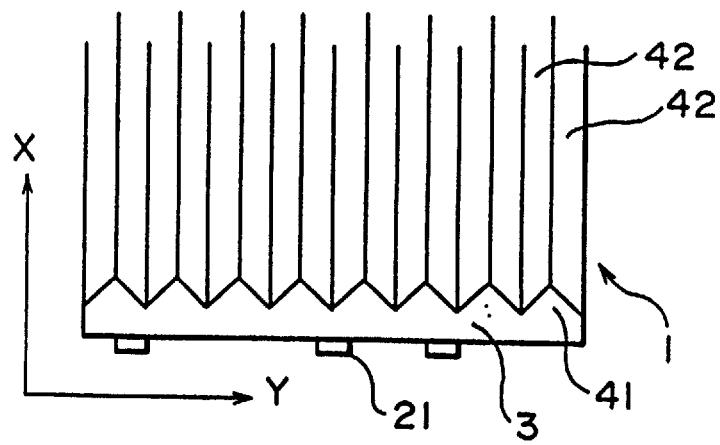
FIGS. 11A and 11B are schematic diagrams for explaining that the side surfaces of the cluster members is not in parallel with the structural surface of the lens array.
Figure 11B:
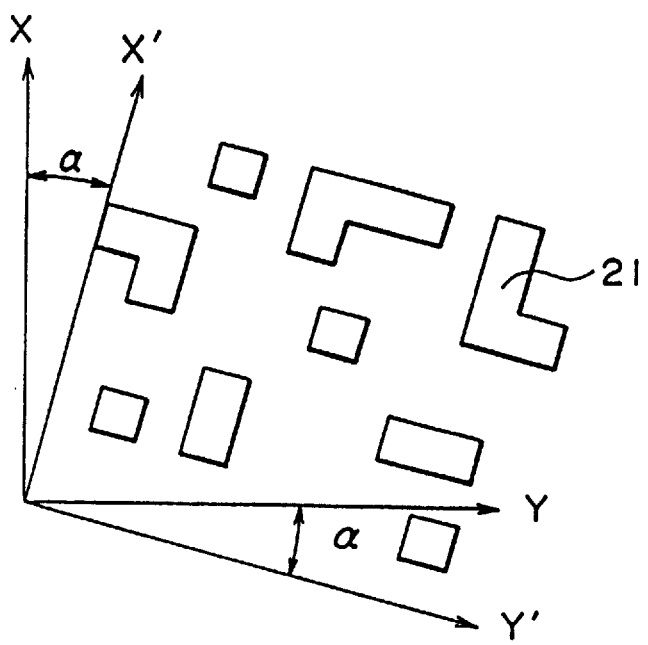

FIGS. 11A and 11B are schematic diagrams for explaining a structure for preventing the moiré fringes from taking place. For example, as shown in FIG. 11A, assume a structure of which the lens array of the lens array sheet 1 is composed of triangular prism lenses as lens elements 41. The light emitting surface of the lens array sheet 1 is in parallel with the X-Y plane. The light emitting surface is referred to as a horizontal surface. The normal direction perpendicular to the light emitting surface is the direction of the axis Z (not shown). The structural surfaces of each lens element 41 are inclined surfaces 42 that form the top and the bottom of a triangular prism. The line of intersection of the inclined surfaces and the horizontal surface is in parallel with the axis X (in this case, the coordinates are defined so that the axis X is in parallel with the line of intersection). Strictly speaking, the inclined surface is a finite surface. The horizontal surface can be defined in various manners depending on the coordinates of the axis Z. The inclined surface does not intersect with the horizontal surface depending on a condition. In this example, the line of intersection represents the line of which the inclined surface is extended and intersected with the horizontal surface. When triangular prisms as lens elements are one-dimensionally arrayed, there is one line of intersection. On the other hand, when quadrangular prisms as lens elements are two-dimensionally arrayed, there may be two or more lines of intersection. In this case, the lines of intersection may be not perpendicular to each other.

FIG. 11B is a schematic diagram showing the case that X-Y coordinates corresponding to the line of intersection of the lens elements 41 of the triangular prisms is overlaid with X'-Y' coordinates corresponding to axis X' of one line of intersection obtained from the cluster 2.

The orientations of the cluster members 21 are arranged. There are two lines of intersection of side surfaces of the cluster members 21 and the horizontal surface of the lens array sheet. The two lines of intersection are perpendicular to each other. They are lines of intersection in parallel with the axis X' and the axis Y'. The axis X' and the axis X form an angle α.

When the angle α between the axis X and the axis X' is zero, the axis X is in parallel with the axis X'. Thus, the moiré fringes tend to take place. However, when the line of intersection of each lens element has an angle of 5° to the line of intersection of each cluster member, the moiré fringes can be prevented. In other words, in the case that the lines of intersection of the cluster members define an orthogonal coordinate system, when the angle α is in the range from 5° to 85° (in the clockwise direction), more preferably in the range from 10° to 80° (in the clockwise direction), the moiré fringes can be effectively prevented. In addition, the angle α is preferably in the range from −5° to −85° (in the counterclockwise direction), more preferably in the range from −10° to −80° (in the counterclockwise direction). In the case of the rectangular parallelepiped shape, when the angle α exceeds 85°, the angle to the line of intersection of the side surface becomes large. Thus, since the relation between the adjacent side surfaces (90° to the side surface) becomes almost parallel. Consequently, due to the relation with the adjacent side surfaces, the moiré fringes tend to take place. When the side surface of the cluster members composed of cluster member elements with a rear surface formed in a rectangular shape that defines the orthogonal coordinate system has an angle exceeding 5° to the horizontal direction, the moiré fringes can be prevented.

When the cluster members are composed of for example rectangular parallelepiped members and the angle between the line of intersection of a particular side surface of each rectangular parallelepiped member and the horizontal surface of the lens array sheet and the line of intersection of the surface of each lens element and the horizontal line exceeds 5°, it is not necessary to arrange the orientations of all the cluster members (formed in the rectangular parallelepiped shape) allocated to structural elements. For example, even if 1% of all cluster members are arranged in parallel, when they are not disposed at adjacent lattice elements, the parallel relation of which the moiré fringes take place is not defined.

Thus, in claim 18 of the third aspect of the present invention, "each rectangular parallelepiped member" where the line of intersection of a side surface of each rectangular parallelepiped member is not in parallel with the line of intersection of a lens element does not mean that all rectangular parallelepiped members that are formed do not have a non-parallel relation, but that even if part of rectangular parallelepiped members have a parallel relation, the non-parallel relation takes place as the general situation.

As the shape of each cluster member according to the third aspect of the present invention, a prism shape can be used instead of the rectangular parallelepiped shape as described above. When the above-described rectangular parallelepiped members are disposed to structural elements in the same direction, the angle of each adjacent side is 90°. Thus, whenever the rectangular parallelepiped members are rotated for 90°, the same situation takes place. However, in the case of the rectangular parallelepiped shape, since each opposite side surfaces are in parallel, it is necessary to consider two lines of intersection that are perpendicular to each other. However, in the case of the prism shape other than the rectangular parallelepiped shape, for example a triangular prism shape, the number of lines of intersection to be considered is three. In the case of a pentagonal prism shape, the number of lines of intersection to be considered is five. In these cases, the number of lines of intersection to be considered is greater than that in the case of the rectangular parallelepiped shape. Thus, the probability of the occurrence of the moiré fringes increases. Consequently, the degree of freedom of designing the lens array sheet decreases. Even in the case of a free quadrilateral shape where each adjacent side does not form a right angle, the number of lines of intersection to be considered is as many as four. Thus, even if a quadrangular prism shape with a rear surface that has a parallelogram shape or a rhombus shape is used, as with the case of the rectangular parallelepiped shape, the occurrence of the moiré fringes can be prevented. However, the cluster members in the rectangular parallelepiped shape is more easily fabricated than those in the quadrangular prism shape with the rear surface having a parallelogram shape or a rhombus shape.

In the case that the lines of intersection of side surfaces are not straight lines, there is an n-side prism (where n is infinite) (namely, a circular cylinder shape or an elliptic cylinder shape where the side surface is a curved surface). In this case, when an original press film for forming cluster members and thereby the cluster member elements is produced by a horizontal scanning method using a scanner or the like, since the cluster members are very small, the contour of for example a circular shape of side surfaces that are not in parallel with or perpendicular to scanning lines are rugged. Thus, a smooth side surface of the cylinder cannot be obtained.

The moiré fringes that take place in the relation between the structural surface of each cluster member and the structural surface of each lens element. In other words, when the cluster members are allocated to structural elements in the same orientation, the side surfaces thereof are arranged. Thus, a line of intersection that can be recognized is defined. This is because the relation between the line of intersection of each cluster member and the line of intersection of each lens element takes place. However, even if the shapes of the cluster members are the same, when they are randomly formed (namely, the cluster members are rotated around the axis Z that is perpendicular to the X-Y plane), the line of intersection of a side surface of each cluster member has an angle that is dispersed. Thus, there is no line of intersection defined at a predetermined angle. In such a manner, the occurrence of the moiré fringes can be prevented. In this point, the circular cylinder shape, the elliptic cylinder shape, and the like are superior to the other shapes. However, as described above, the side surface that is a smoothly curved surface is difficult to fabricate.

The distribution density of the cluster members is designated so that the lens array sheet is not bent and thereby the equal-thickness interference fringes do not take place. In addition, even if the lens array sheet has a proper rigidity, a homogeneous distance between the lens array sheet and the optical conductor or between the lens array sheets can be maintained so that a small difference of the distances prevents the equal-thickness interference fringes from taking place. Thus, the lattice size of the tow-dimensional lattice can be designated corresponding to the distribution density.

In the case that two lens array sheets are layered, the distribution density of which the sectional area of each cluster member is zero (namely, the distribution density of the cluster members) is preferably designated to the relation of t<2p (where t is the average distance of adjacent cluster members formed on the rear surface of the upper lens array sheet; and p is the repetitive period of the lens elements formed on the front surface of the lower lens array sheet). Thus, since supporting contacts between the cluster members 21 formed on the rear surface of the upper lens array sheet and the lens elements 41 formed on the front surface of the lower lens array sheet are prevented from being bent regardless of the sectional area of the cluster member elements, the distance between the upper and lower lens array sheets does not become heterogeneous. Consequently, the equal-thickness interference fringes do not take place. In addition, the distance between the upper and lower lens array sheets can be prevented from becoming smaller than the wave length of the source light. The average distance t is more preferably in the range of t<0.5 p. However, in reality, since the cluster member elements have a finite sectional area and they are connected, even if t is greater than 0.5 p, this effect can be satisfactorily accomplished.

On the other hand, as a distribution density for preventing the equal-thickness interference fringes from taking place even if the lens array sheet bends in the case that the sectional area of each cluster member is finite, the area ratio Sr (=(Sp/St)×100) of the sum of Sp of the sectional areas of the cluster members against the entire area St of which the lens array sheet 1 faces the optical conductor 51 is preferably in the range from around 0.01 to 60%. As the function of spacers, the number of cluster members should be as small as possible. However, to prevent the lens array sheet from bending, a proper number of cluster members are required. When the lens array sheet is used as a surface light source along with an optical conductor (that will be described later), a proper number of cluster members are required to homogenize the surface distribution of the luminance. In particular, when the lens array sheet has a bending characteristic equivalent to a biaxial drawing polyethylene terephtalate with a thickness of 50 to 100 $\mu$m, Sr is preferably in the range from 20 to 60%.

The above-described randomizing process corresponding to the theory of percolation can be performed by for example a computer. The calculated result is printed on an original press film. Alternatively, a block of cluster members that have been randomized can be repeatedly formed in vertical and horizontal directions so as to form cluster members with a required area.

In the third aspect of the present invention, when the above-described cluster members are formed on one surface of the lens array sheet, light that is emitted out of the angular range of visual field is not increased and thereby the luminance is not decreased. In addition, the equal-thickness interference fringes and the moiré fringes can be prevented. Thus, the lens array sheet can homogeneously distribute light on the entire surface of the optical conductor with a homogeneous surface distribution.

Next, a surface light source and a transmission type display device having the lens array sheet according to the first to third aspects of the present invention will be described.

Figure 21:
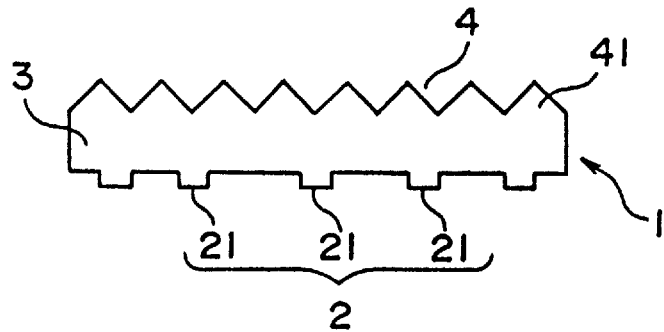
FIG. 21 is a vertical sectional view showing a layer structure of a one-layer type lens array sheet according to an embodiment of the first to third aspects of the present invention.
Figure 22:
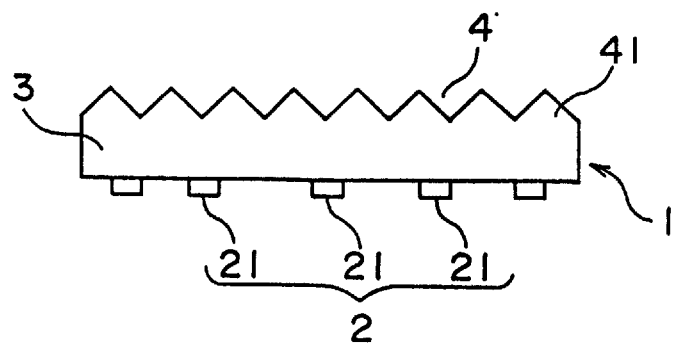
FIG. 22 is a vertical sectional view showing a layer structure of a two-layer type lens array sheet according to an embodiment of the first to third aspects of the present invention.
Figure 23A:
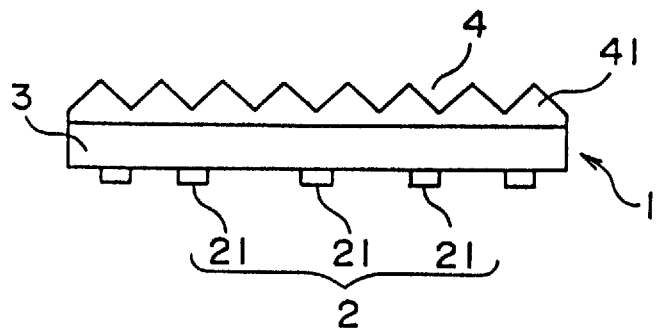
FIGS. 23A and 23B are vertical sectional views showing layer structures of three-layer type lens array sheets according to embodiments of the first to third aspects of the present invention.
Figure 23B:
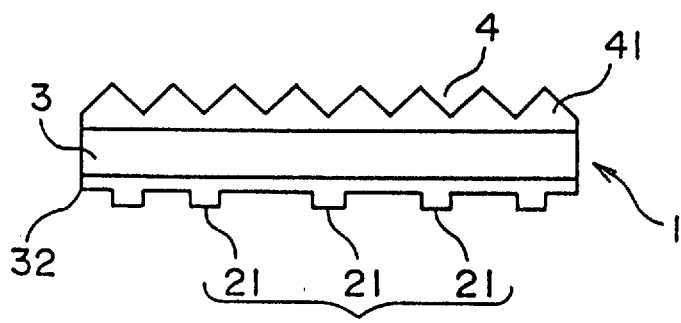

As shown in FIGS. 23A and 23B, the lens array sheet 1 according to the first to third aspects of the present invention may be composed of three layers that are a flat transparent substrate 3, a cluster 2, and a lens array 4. In this case, the cluster 2 is composed of a large number of cluster members 21. The cluster 2 is formed on one surface of the transparent substrate 3. The lens array 4 is formed on the other surface of the transparent substrate 3. Alternatively, as shown in FIG. 22, the lens array 4 and the transparent substrate 3 may be integrally formed. On the resultant structure, the cluster 2 may be layered so as to accomplish a two-layer type lens array sheet. As another alternative structure, as shown in FIG. 21, the lens array 4, the transparent substrate 3, and the cluster 2 may be integrally formed so as to accomplish a one-layer type lens array sheet. In such an integrally formed lens array sheet, the transparent substrate is not always required. In this case, the cluster may be formed on the rear surface of the lens array The integral member of the lens array and the cluster can be treated as the transparent substrate.

In FIG. 23B, a transparent cluster base 32 and the cluster 2 are integrally formed. The cluster base 32 is formed on one entire surface of the transparent substrate 3. In this structure, the cluster base 32 may be is formed on the transparent substrate 3 along with the cluster. In this case, the cluster base 32 can be considered as a part of the transparent substrate 3.

The transparent substrate, the cluster, and the lens array are composed of a transparent material. Depending on the application, such a material may be colored or semi-transparent. In addition, since the size of cluster members is small, they may be transparent as long as they are invisible.

As examples of the transparent material for the transparent substrate, the lens array, and the cluster, a polyester resin (such as polyethylene terephtalate or polybutylene terephtalate), an acrylic resin (such as polymethyl methacrylate), a thermoplastic rein (such as polycarbonate resin, polyethylene resin, or polymethyl pentene), or an ionizing-radiation-curable resin (such as polyester acrylate, urethane acrylate, or epoxy acrylate that is composed of a monomer or the like such as oligomer and/or acrylate). The ionizing-radiation-curable resin is hardened with ionizing radiation such as ultraviolet ray or radiation. The refractive index of such a resin is normally in the range from 1.49 to 1.55. As another material other than such a resin, glass, ceramics, or the like can be used as long as it has a good transparent characteristic.

The total thickness of the lens array sheet is normally in the range from 20 to 1000 $\mu$m.

Figure 24:
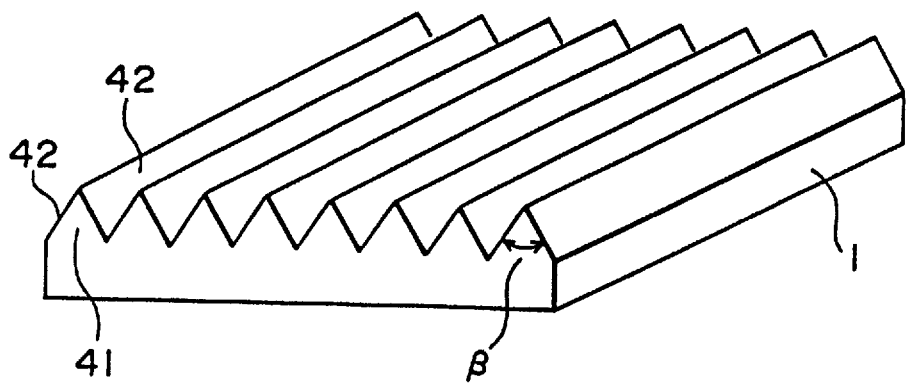
FIG. 24 is a perspective view showing an example (triangular prism lens) of the lens array of the lens array sheet according to the first to third aspects of the present invention.
Figure 27:
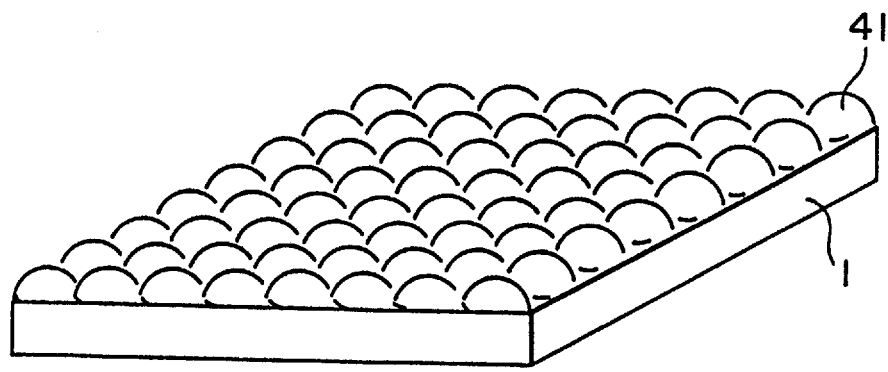
FIG. 27 is a perspective view showing another example (fly-eye lens) of the lens array of the lens array sheet according to the first to third aspects of the present invention.
Figure 28:
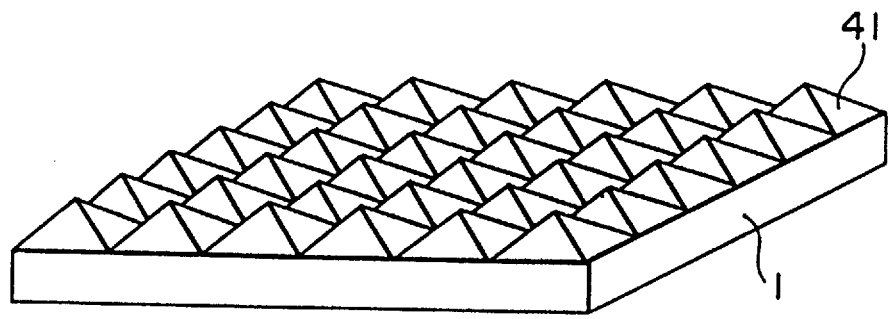
FIG. 28 is a perspective view showing another example (pyramid lens) of the lens array of the lens array sheet according to the first to third aspects of the present invention.

As an example of the lens array of the lens array sheet according to the first to third aspects of the present invention, as shown in FIG. 24, a linear array of prism lens of which lens elements 41 formed in a triangular prism shape are adjacently arrayed so that the longer axis (edge line) of each lens element 41 is one-dimensionally arranged in parallel (linear array). This lens array is referred to a lenticular lens array in a wide sense. Alternatively, as shown in FIG. 27, lens elements 41 formed in a semi-sphere shape are two-dimensionally arrayed as a fly-eye lens array.

Figure 25:
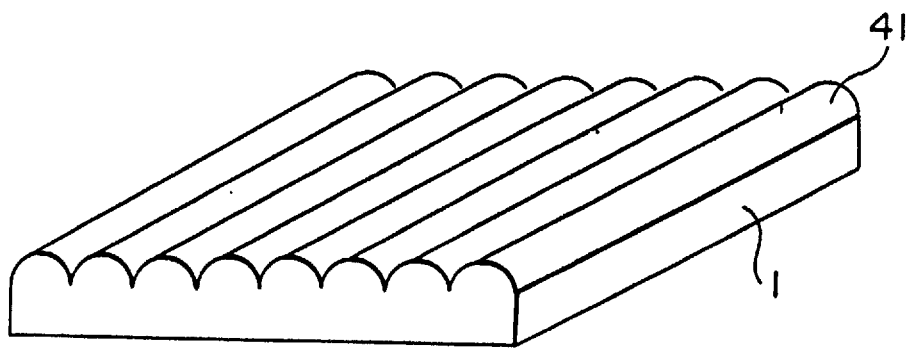
FIG. 25 is a perspective view showing another example (elliptical cylinder lens) of the lens array of the lens array sheet according to the first to third aspects of the present invention.
Figure 26:
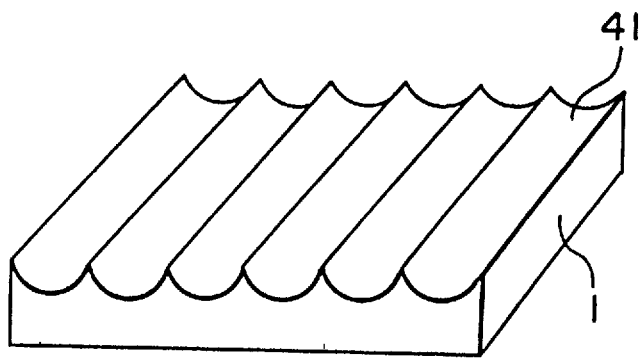
FIG. 26 is a perspective view showing another example (concave lens) of the lens array of the lens array sheet according to the first to third aspects of the present invention.

Examples of the sectional shape of the lens elements, as shown in FIGS. 25 and 26, are smoothly continuous curves such as a circle shape, an ellipse shape, a cardioid shape, a Rankine's egg shape, a cycloid shape, and an involute curve shape. Alternatively, as shown in FIG. 24, as the sectional shape of the lens elements, part or all of a polygon shape such as a triangle shape, a quadrilateral shape, or a hexagon shape can be used.

In addition, as lens elements that are two-dimensionally arrayed, pyramid lenses can be used.

The lens elements may be formed in a convex shape as shown in FIGS. 24, 25, 27, and 28 or a concave shape as shown in FIG. 26. Among these shapes of the lens elements, a circular cylinder shape or an elliptic cylinder shape are preferable from view points of easy design and fabrication, light condensing characteristic, and light diffusion characteristics (low half value angle and low side robe light (that largely deviates from the normal of the light emitting surface of the lens array sheet), isotropy of luminance in the half value angle, and luminance in normal direction). In particular, the elliptic cylinder shape of which the normal direction of the surface light source accords with the longer diameter is preferable for high luminance.

In FIGS. 24, 25, 26, 27, and 28 for explaining the shapes of the lens elements, the clusters are omitted.

As a fabrication method for fabricating a lens array sheet, to accomplish a one-layer type lens array sheet shown in FIG. 21, dies corresponding to the lens array 4 and the cluster 2 can be used by a known heat press method or a known injection casting method using a thermoplastic resin as disclosed in for example Japanese Patent Laid-Open Publication No. 56-157310. Alternatively, the lens array sheet may be fabricated by an injection casting method using a radiation curable resin or a thermosetting resin.

As another fabrication method as disclosed in for example Japanese Patent Laid-Open Publication No. 5-169015, a form plate cylinder (cylindrical casting mold) having a concave portion (precisely speaking, a cluster shape) corresponding to the shape of a desired lens array is filled with an ionizing radiation curable resin solution. A transparent substrate sheet is layered on the resultant structure. An ionizing radiation such as an ultraviolet ray or an electron beam is applied to the transparent sheet side (or to the form plate cylinder when it is composed of glass or the like that is transparent). Thus, the ionizing radiation curable resin solution is cured (cross linked or polymerized to solid). Thereafter, the transparent substrate sheet is peeled off from the form plate cylinder along with the hardened resin. Thus, an intermediate sheet of the lens array sheet of which the lens array 4 in the desired shape is formed on the transparent substrate sheet is obtained.

Thereafter, the similar process is performed on the rear surface of the intermediate sheet with a form plate cylinder corresponding to the shape of a desired cluster. Thus, the lens array sheet having the cluster and the lens array according to the first to third aspects of the present invention can be accomplished.

Figure 33:
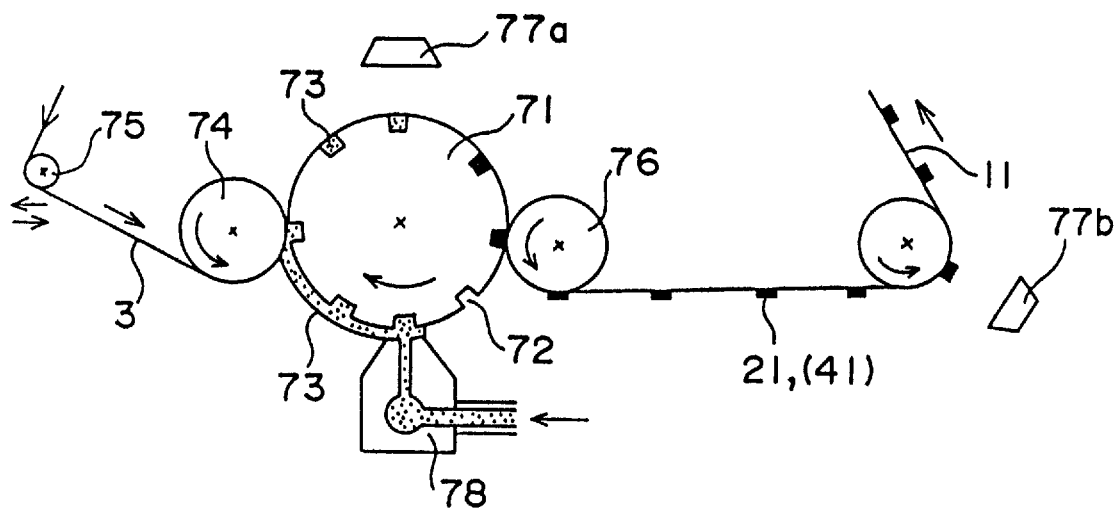
FIG. 33 is a conceptual schematic diagram showing an example of a fabrication apparatus of the lens array sheet according to the first to third aspects of the present invention.

It is possible to form a cluster before a lens array. FIG. 33 is a sectional view showing a fabrication apparatus for fabricating a lens array sheet using such an ionizing radiation curable resin.

In the fabrication apparatus shown in FIG. 33, reference numeral 71 is a form plate cylinder having a concave portion 72 corresponding to a cluster 2 (or a lens array 4). In the drawing, concave portions are represented by square sections The form plate cylinder is rotated around the axis thereof in the arrow direction. Reference numeral 73 is an ionizing radiation curable resin solution filled in the concave portions. Reference numeral 3 is a sheet type transparent material (substrate). Reference numeral 74 is a pressing roll that contacts the form plate cylinder so as to press the transparent substrate 3 to the form plate cylinder 71. Reference numeral 75 is a guide roll that supports the traveling of the transparent substrate 3. Reference numeral 76 is a peeling roll. Reference numerals 77a and 77b are ionizing radiation radiating units that harden ionizing radiation curable resin solution to the solid state. Reference numeral 21 is a cluster formed on the transparent substrate 3 as a hardened substance of the ionizing radiation curable resin solution. Reference numeral 11 is an intermediate sheet having the cluster 21 (or the lens array 4) formed on the transparent substrate 3. Reference numeral 78 is a coating unit that coats the ionizing radiation curable resin solution.

In the above-described fabrication method, as the sheet type transparent substrate, a polyester resin such as polyethylene terephtalate or polybutylene terephtalate can be used. The thickness of the transparent substrate is normally in the range from 10 to 1000 $\mu$m although it depends on the workability of the apparatus and so forth.

In such a method, as shown in FIG. 23, a three-layer type lens array sheet having layers of a cluster 2, a lens array 4, and a transparent substrate 3 can be accomplished.

In a two-layer type lens array sheet as shown in FIG. 22, an intermediate sheet having a lens array is fabricated by the above-described rotary casting method, injection casting method, or the like. Thereafter, by the method using the above-described ionizing radiation curable resin and the form plate cylinder or a flat casting mold, a cluster is formed.

Next, an edge light type surface light source 100 according to the first to third aspects of the present invention can be accomplished by disposing the lens array sheet according to the first to third aspects of the present invention on the light emitting surface of a surface light source composed of a light source, an optical conductor, a reflection layer, and so forth that are known.

FIG. 30 is a perspective view showing the edge light type surface light source according to an embodiment of the first to third aspects of the present invention. The edge light type surface light source comprises an optical conductor (light guide) 51, a linear type or point type light source 52, a light reflection layer 53, and a lens array sheet 1. The light source 52 is adjacently disposed at least one of the side edge surfaces. The light reflection layer 53 is formed on the rear surface of the light conductor 51. The lens array sheet 1 accords with the present invention. The edge light type surface light source further comprises a lamp house 54 having an inner reflection surface disposed around the light source 52.

The optical conductor 51 is a transparent plate composed of an acrylic resin, a polycarbonate resin, or the like with a thickness of 1 to 10 mm. The light source 52 is a linear light source such as an air-cooling cathode ray tube. The light reflection layer 53 is formed by coating a white paint on a base material or depositing or plating a metal film on a metal film that has been sand-blasted so as to diffuse and reflect light. In addition, a white light diffusion dot pattern may be formed so as to homogenize the amount of light emitted from the light emitting surface.

Moreover, a light diffusion sheet may be disposed between the optical conductor 51 and the lens array sheet 1 so as to homogeneously diffuse light and allow the light diffused dot pattern on the light reflection layer 53 to become invisible.

Figure 29:
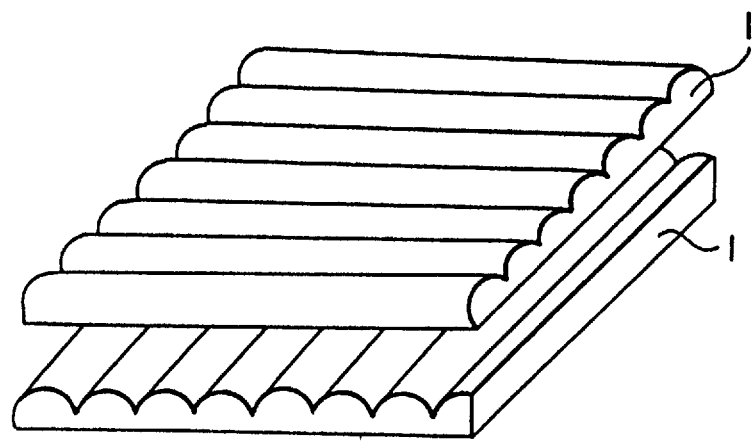
FIG. 29 is a perspective view for explaining a two-layer structure of the lens array sheet according to the first to third aspects of the present invention.

When the lens array sheet is disposed at the surface light source, to provide light diffusion angles in two directions (vertical and horizontal directions), as shown in FIG. 29, two lens array sheets may be layered so that the edge lines of the lens elements of the first lens array sheet are perpendicular to those of the second lens array sheet. In this case, when the orientation of the surface on which the lens array is formed (hereinafter referred to as a lens surface) of the first lens array sheet is the same as that of the second lens array sheet, transmissivity of light is improved and the moiré fringes between the lens surface of the lower lens array sheet and the cluster of the rear surface of the upper lens array sheet can be prevented. However, it is possible to dispose the two lens array sheets so that the lens surfaces thereof face each other.

In the case that two lens array sheets are used, when the light diffusion sheet 56 that has two surfaces with concave and convex portions (projection) whose height is homogeneous to or greater than the wave length of the light source is disposed between a lens array sheet and an optical conductor 51, the cluster on the rear surface of the lower lens array sheet can be omitted. This is because the concave and convex portions on the top and rear surfaces of the light diffusion sheet prevent the optical contact from taking place. In this structure, although two lens array sheets are used, one lens array sheet is a conventional lens array sheet 19 whose rear surface is flat. Thus, the fabrication cost can be reduced. With the light diffusion sheet, light can be homogeneously diffused Although the amount of light that is emitted out of the angular range of visual field increases, the light diffusion dot pattern of the light reflection layer on the rear surface of the optical conductor can become invisible.

Figure 32:
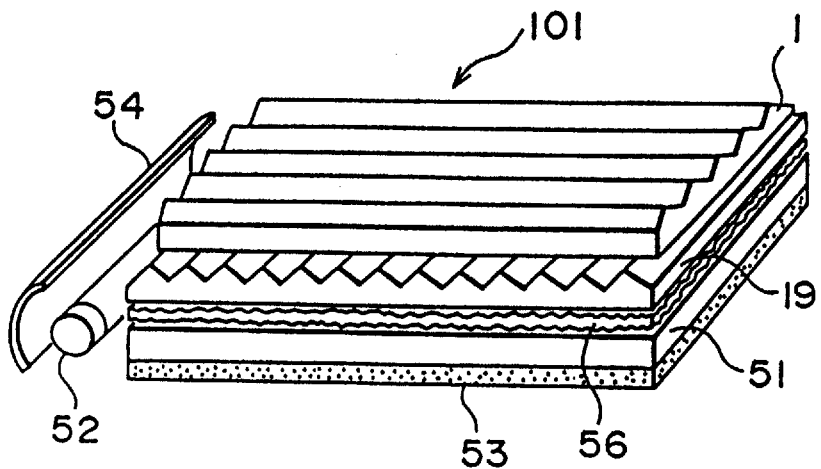
FIG. 32 is a perspective view showing an edge light type surface light source according to another embodiment of the first to third aspects of the present invention.

FIG. 32 shows such an edge light type surface light source 101.

The bottom-flat lens array sheet has an lens array of which lens elements are one- or two-dimensionally arrayed on the front surface of the transparent substrate. Thus, the rear surface of the lens array sheet is flat. Consequently, the structure of the lens array sheet is the same as that of the lens array sheet 1 according to the first to third aspects of the present invention except that the cluster 2 on the rear surface is omitted. Thus, the material and fabrication method are the same as those of the lens array sheet according to the first to third aspects of the present invention.

The light diffusion sheet has concave and convex portions on the top and rear surfaces thereof so as to prevent the optical conductor from contacting the rear surface of the lower lens array sheet. The light diffusion is performed by the concave and convex portions or a light diffusion agent in the light diffusion sheet. As the light diffusion sheet, a known light diffusion sheet can be used. For example, the light diffusion sheet can be composed by dispersing light diffusion particles to a transparent substrate such as an acrylic resin or by forming an emboss pattern such as a sand-face pattern on the front surface of the transparent resin.

Figure 31:
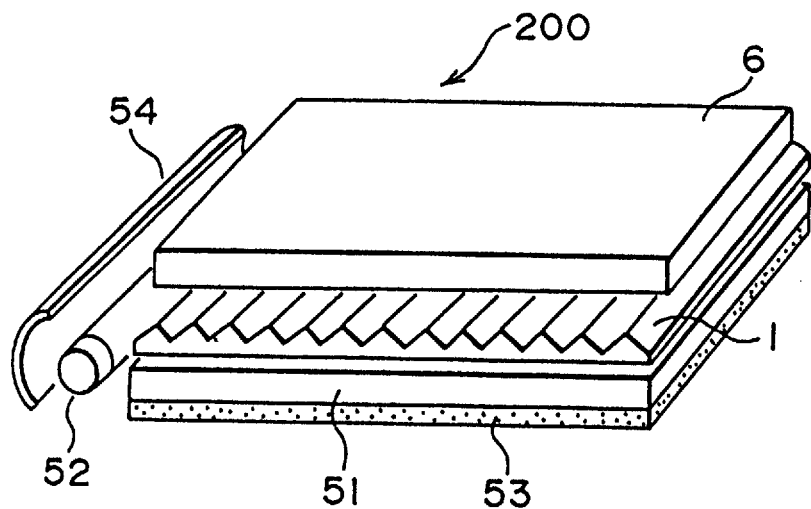
FIG. 31 is a perspective view showing an edge light type surface light source according to an embodiment of the first to third aspects of the present invention.

When the edge light type surface light source according to the first to third aspects of the present invention is disposed on the rear surface of the light transmitting display device such as a transmission type liquid crystal display device or an advertisement board. FIG. 31 is a transmission type display device 200 of which the transmission type display device 6 is disposed to the surface light source 100 (shown in FIG. 30) according to the first to third aspects of the present invention.

Examples corresponding to First Aspect of Present Invention

<First Example>

By a fabrication apparatus as shown in FIG. 33, an intermediate sheet having a lens array composed of lens elements formed in an isosceles triangle shape whose apex angle β (see FIG. 24) was 100° was formed by coating an ultraviolet ray curable resin solution mainly composed of urethane acrylate prepolymer on a biaxial drawing polyethylene terephtalate with a thickness of 100 μm as a transparent substrate.

Likewise, by the apparatus shown in FIG. 33, the same ultraviolet ray curable resin solution was coated on the rear surface of the intermediate sheet so as to randomly form a large number of cluster members in a rectangular parallelepiped shape of which the height H was 10 μm, the width a was 125 μm, and the depth b was 125 μm. Thus, a lens array sheet according to the first aspect of the present invention was obtained.

The form plate cylinder (shown in FIG. 33) for randomly forming the cluster members was produced in the following manner. Image data was generated by a computer image process. As shown in FIGS. 5 and 6, cluster members are represented in black and overlap portions are represented in white (concentration=zero). The image data was exposed to a reprophotographic silver-salt-photosensitive film by using a reprophotographic scanner. Thus, a printing film was obtained (rectangles representing cluster members are black, whereas the overlap portions and non-rectangular portions are transparent). A photosensitive resist was coated on the front surface of a copper cylinder. The printing film was contacted to the resultant cylinder and then exposed. The resultant cylinder was developed so as to remove the resist of the non-sensitive portion (inside of the rectangles 21 of FIG. 5B). Thus, a resist pattern of which a hardened film was formed on the exposed portion was formed. The resist was etched out with a ferric chloride solution from the front surface of the cylinder. Thus, a form plate cylinder having rectangular parallelepiped shape concave portions that were randomly distributed was obtained The depth of all the rectangular parallelepiped shape portions of the press was the same.

The orientation of each of the rectangular parallelepiped shape cluster members was the same. The line of intersection of the side surface of each rectangular parallelepiped shape cluster member and the horizontal surface of the lens array sheet (the axis X' of FIG. 4) was in parallel with the line of intersection of the structural surface of each lens element and the horizontal surface of the lens array sheet (the axis X of FIG. 4). The ratio Sr of the cluster members to the entire sectional area was 60 [%].

<Second Example>

The lens array sheet according to the first aspect of the present invention was obtained in the same manner as the first example except that the height H of each rectangular parallelepiped cluster member was 15 μm.

<Third Example>

The lens array sheet according to the first aspect of the present invention was obtained in the same manner as the first example except that the height H of each rectangular parallelepiped cluster member was 20 μm.

<Fourth Example>

The lens array sheet according to the first aspect of the present invention was obtained in the same manner as the first example except that the rectangular parallelepiped cluster members were rotated, that the orientation thereof was the same, and that the angle between the axis X' and the axis X of FIG. 4 was 10°.

<First Compared Example>

A lens array sheet was obtained in the same manner as the first example except that the lens array was formed on the front surface of the intermediate sheet and that the cluster was not formed on the rear surface thereof <Second Compared Example>

A matted lens array sheet was obtained in the same manner as the first example except that after the intermediate sheet having the lens array on the front surface, a coating solution of which acrylic resin beads with particle diameters of 2 to 20 μm of 3 weight % was added to a two part curable type urethane resin was coated on the rear surface of the intermediate sheet for 5 g/m² by gravure coating method.

<Third Compared Example>

A rear-surface-matted lens array sheet was obtained in the same manner as the first example except that the form plate cylinder was composed by sand-blasting sand in #80 sphere shape on the front surface of the cylinder.

Table 1 shows the characteristics of the above-described examples and compared examples for the following evaluation items.

(a) Contact resistance: When the rear surface of the lens array sheet did not optically contact the other plate (the light emitting surface of the optical conductor), this item was evaluated as "O". Otherwise, this item was evaluated as "X". In other words, when the region in the vicinity of the light source of the light emitting surface was brighter than other portions, this item was evaluated as "X". When a brighter region in the vicinity of the light source was not viewed, this item was evaluated as "O".

(b) Equal-thickness interference fringes: When the lens array sheet 1 and another flat plate were layered and observed, if equal-thickness interference fringes were not viewed, this item was evaluated as "O". Otherwise, this item was evaluated as "X".

(c) Moiré fringes: When the lens array sheet was observed, if moiré fringes were not viewed between the cluster and the lens array, this item was evaluated as "O". Otherwise, this item was evaluated as "X".

(d) Luminance factor: The portion other than the lens array sheet was treated as the same edge light type surface light source. The lens array sheet of each of the above-described examples and compared examples was disposed on the front surface of the optical conductor so that the lens array faced the output side of the surface light source. The luminance was measured by a variable angle photometer GONIOPTOMETER made by MURAKAMI SHIKISAI KENKYUJYO K. K. With a reference of the measurement, the luminance in the normal direction of the first compared example of which no cluster was not formed on the rear surface was designated to 100%.

(e) Angular range of visual field: Assuming that the luminance in the normal direction was 100%, the angular range where the luminance became 50% or greater than 50% to the normal (half value angle) was measured in the same manner as the item (d).

TABLE 1

Comparison of Characteristics of Examples and Compared Examples

| | Contact resistance | Equal-thickness interference fringes | Moiré fringes | Luminance factor [%] | Angular range of visual field [o] |
|---|---|---|---|---|---|
| First example | o | o | x | 98 | 75 |
| Second example | o | o | x | 97 | 75 |
| Third example | o | o | x | 94 | 75 |
| Fourth example | o | o | o | 98 | 75 |
| First compared example | x | x | o | 100 | * |
| Second compared example | o | x | o | 92 | 80 |
| Third compared example | o | o | o | 83 | 82 |

*: Not measurable. At a position with a distance of 2 cm to the light source, the emitted light remarkably becomes dirk.

Examples Corresponding to Second Aspect of Present Invention

<First Example>

By a fabrication apparatus as shown in FIG. 33, an intermediate sheet having a lens array composed of lens elements formed in an isosceles triangle shape whose apex angle β (see FIG. 24) was 100° was formed by coating an ultraviolet ray curable resin solution mainly composed of urethane acrylate prepolymer on a biaxial drawing polyethylene terephtalate with a thickness of 100 μm as a transparent substrate.

Likewise, by the apparatus shown in FIG. 33, the same ultraviolet ray curable resin solution was coated on the rear surface of the intermediate sheet so as to randomly form a large number of cluster members in a rectangular parallelepiped shape of which the height H was 10 μm, the width a was 100 μm, and the depth b was 100 μm. Thus, a lens array sheet according to the second aspect of the present invention was obtained.

The form plate cylinder 72 (shown in FIG. 33) for randomly forming the cluster members was produced in the following manner. Image data was generated by a computer image process. As a two-dimensional lattice, a square lattice as shown in FIG. 7A (a=b=250 μm) was used. Coordinates of each lattice point were varied in the directions of the X and Y axes with random numbers (in the range from −0.5 to +0.5) with α=β=350 μm in the [Formula 3.2] and [Formula 3.3]. As shown in FIG. 6, cluster members are represented in black and overlap portions are represented in white (concentration=zero) The image data was exposed to a reprophotographic silver-salt-photosensitive film by using a reprophotographic scanner. Thus, a printing film was obtained (in FIG. 5C, rectangles representing cluster members are black, whereas the overlap portions and non-rectangular portions are transparent). A photosensitive resist was coated on the front surface of a copper cylinder. The printing film was contacted to the resultant cylinder and then exposed. The resultant cylinder was developed so as to remove the resist of the non-sensitive portion (inside of the rectangles). Thus, a resist pattern of which a hardened film was formed on the exposed portion was formed. The resist was etched out with a ferric chloride solution from the front surface of the cylinder. Thus, a form plate cylinder having rectangular parallelepiped shape concave portions that were randomly distributed was obtained. The depth of all the rectangular parallelepiped shape portions of the press was the same.

The orientation of each of the rectangular parallelepiped shape cluster members was the same. The line of intersection of the side surface of each rectangular parallelepiped shape cluster member and the horizontal surface of the lens array sheet (the axis X' of FIG. 4) was in parallel with the line of intersection of the structural surface of each lens element and the horizontal surface of the lens array sheet (the axis X of FIG. 4). The ratio Sr of the cluster members to the entire sectional area was 15 [%].

<Second Example>

The lens array sheet according to the second aspect of the present invention was obtained in the same manner as the first example except that the height H of each rectangular parallelepiped cluster member was 15 μm.

<Third Example>

The lens array sheet according to the second aspect of the present invention was obtained in the same manner as the first example except that the height H of each rectangular parallelepiped cluster member was 20 μm.

<Fourth Example>

The lens array sheet according to the second aspect of the present invention was obtained in the same manner as the first example except that the rectangular parallelepiped cluster members were rotated, that the orientation thereof was the same, and that the angle between the axis X' and the axis X of FIG. 4 was 10°.

<First Compared Example>

A lens array sheet was obtained in the same manner as the first example except that the lens array was formed on the front surface of the intermediate sheet and that the cluster was not formed on the rear surface thereof.

<Second Compared Example>

A matted lens array sheet was obtained in the same manner as the first example except that after the intermediate sheet having the lens array on the front surface, a coating solution of which acrylic resin beads with particle diameters of 2 to 20 μm of 3 weight % was added to a two part curable type urethane resin was coated on the rear surface of the intermediate sheet for 5 g/m² by gravure coating method.

<Third Compared Example>

A rear-surface-matted lens array sheet was obtained in the same manner as the first example except that the form plate cylinder was composed by sand-blasting sand in #80 sphere shape on the front surface of the cylinder.

Table 2 shows the characteristics of the above-described examples and compared examples.

The evaluation criteria of the second aspect of the present invention are the same as those of the first aspect of the present invention.

TABLE 2

Comparison of Characteristics of Examples and Compared Examples

| | Contact resistance | Equal-thickness interference fringes | Moiré fringes | Luminance factor [%] | Angular range of visual field [o] |
|---|---|---|---|---|---|
| First example | o | o | x | 98 | 75 |
| Second example | o | o | x | 97 | 75 |
| Third example | o | o | x | 94 | 75 |
| Fourth example | o | o | o | 98 | 75 |
| First compared example | x | x | o | 100 | * |
| Second compared example | o | x | o | 92 | 80 |
| Third compared example | o | o | o | 83 | 82 |

*: Not measurable. At a position with a distance of 2 cm to the light source, the emitted light remarkably becomes dirk.

Examples Corresponding to Third Aspect of Present Invention

<First Example>

By a fabrication apparatus as shown in FIG. 33, an intermediate sheet having a lens array composed of lens elements formed in an isosceles triangle shape whose apex angle β (see FIG. 24) was 100° was formed by coating an ultraviolet ray curable resin solution mainly composed of urethane acrylate prepolymer on a biaxial oriented polyethylene terephtalate with a thickness of 100 μm as a transparent substrate.

Figure 16:
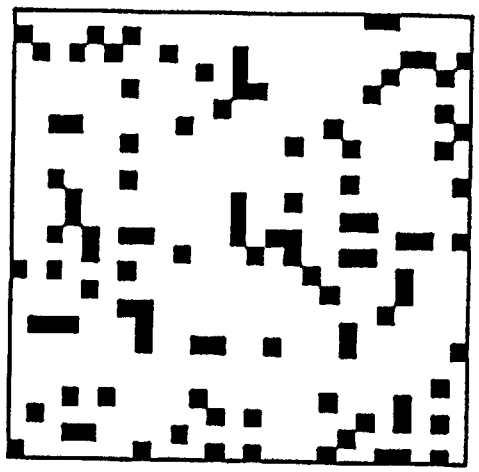
FIG. 16 is a schematic diagram showing a first example of the cluster corresponding to the occupying probability P (No. 1)

Likewise, by the apparatus shown in FIG. 33, the same ultraviolet ray curable resin solution was coated on the rear surface of the intermediate sheet so as to randomly form a large number of cluster members in a rectangular parallelepiped shape of which the height H was 10 μm, the width a was 100 μm, and the depth b was 100 μm. The cluster member elements were disposed in a two-dimensional square lattice with 4096 (long)×4096 (wide) lattice points with a lattice constant of 100 μm as a site percolation model of which the percolation probability P is 0.2. Since one side of the bottom side of each cluster member element was homogeneous to the lattice constant, adjacent cluster member elements were directly connected so as to form cluster members. Thus, a cluster as shown in FIG. 16 was formed. Consequently, the lens array sheet according to the third aspect of the present invention was obtained.

The form plate cylinder (shown in FIG. 33) for forming the cluster members had a front surface corresponding to the reverse shape of the cluster. Image data was generated by a computer image process using Monte Carlo simulation data. The image data was exposed to a reprophotographic silver-salt-photosensitive film by using a reprophotographic scanner. Thus, a printing film was obtained (in FIG. 5C, rectangles representing cluster members are black, whereas the overlap portions and non-rectangular portions are transparent). A photosensitive resist was coated on the front surface of a copper cylinder. The printing film was contacted to the resultant cylinder and then exposed. The resultant cylinder was developed so as to remove the resist of the non-sensitive portion (inside of the rectangles). Thus, a resist pattern of which a hardened film was formed on the exposed portion was formed. The resist was etched out with a ferric chloride solution from the front surface of the cylinder. Thus, a form plate cylinder having rectangular parallelepiped shape concave portions that were randomly distributed was obtained. The depth of all the rectangular parallelepiped shape portions of the form plate was the same.

The orientation of each of the rectangular parallelepiped shape cluster members was the same. The line of intersection of the side surface of each rectangular parallelepiped shape cluster member and the horizontal surface of the lens array sheet (the axis X' of FIG. 11) was in parallel with the line of intersection of the structural surface of each lens element and the horizontal surface of the lens array sheet (the axis X of FIG. 11). The ratio Sr of the cluster members to the entire sectional area was 20 [%]. The maximum rotating radius Rs$^{max}$ of the cluster was 110 μm.

<Second Example>

Figure 17:
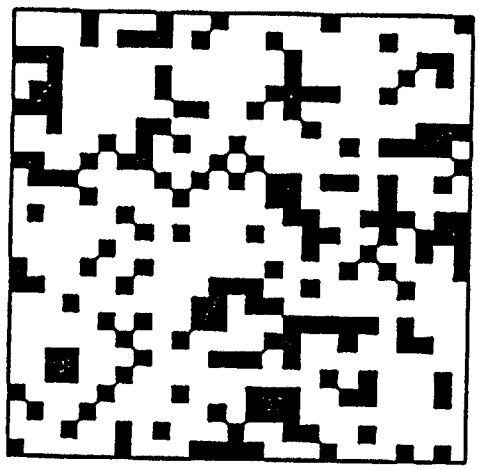
FIG. 17 is a schematic diagram showing another example of the cluster corresponding to the occupying probability P (No. 2)

The lens array sheet according to the third aspect of the present invention was obtained in the same manner as the first example except that the simulation was performed with the occupying probability P=0.3, that Sr=30%, that Rs$^{max}$=230 μm, and that the cluster pattern was as shown in FIG. 17.

<Third Example>

Figure 18:
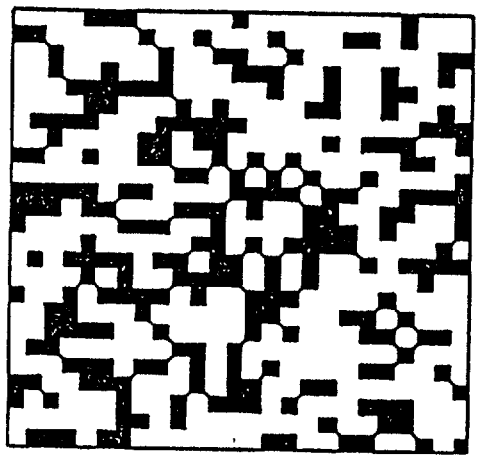
FIG. 18 is a schematic diagram showing another example of the cluster corresponding to the occupying probability P (No. 3)

The lens array sheet according to the third aspect of the present invention was obtained in the same manner as the first example except that the simulation was performed with the occupying probability P=0.4, that Sr=40%, that Rs$^{max}$=260 μm, and that the cluster pattern was as shown in FIG. 18.

<Fourth Example>

Figure 19:
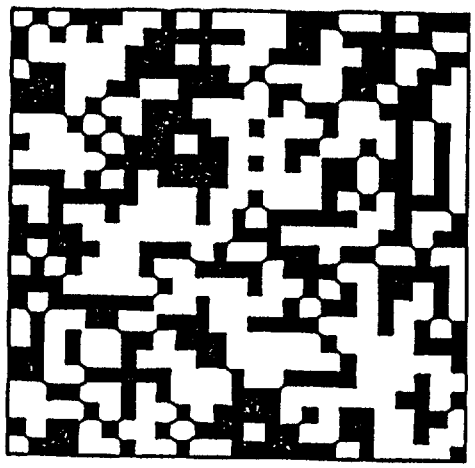
FIG. 19 is a schematic diagram showing another example of the cluster corresponding to the occupying probability P (No. 4)

The lens array sheet according to the third aspect of the present invention was obtained in the same manner as the first example except that the simulation was performed with the occupying probability P=0.5, that SR=50%, that Rs$^{max}$=630 μm, and that the cluster pattern was as shown in FIG. 19.

<First Compared Example>

A lens array sheet was obtained in the same manner as the first example except that the lens array was formed on the front surface of the intermediate sheet and that the cluster was not formed on the rear surface thereof.

<Second Compared Example>

A matted lens array sheet was obtained in the same manner as the first example except that after the intermediate sheet having the lens array on the front surface, a coating solution of which acrylic resin beads with particle diameters of 2 to 20 μm of 3 weight % was added to a two-part curable type urethane resin was coated on the rear surface of the intermediate sheet for 5 g/m² by gravure coating method.

<Third Compared Example>

Figure 20:
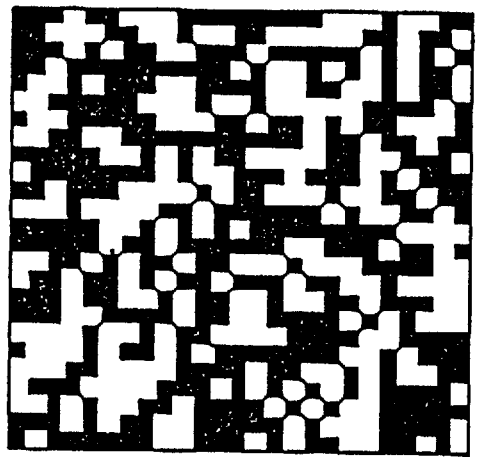
FIG. 20 is a schematic diagram showing another example of the cluster corresponding to the occupying probability P (No. 5)

A lens array sheet was obtained in the same manner as the first example except that the simulation was performed with the occupying probability P=0.6 (>Pc), that S$_R$=63%, that Rs$^{max}$=size of all lattice (equivalent to infinite cluster), and that the cluster pattern was as shown in FIG. 20.

Table 3 shows the characteristics of the above-described examples and compared examples.

The evaluation criteria of the third aspect of the present invention are the same as those of the first aspect of the present invention.

TABLE 3

Comparison of Characteristics of Examples and Compared Examples

| | Contact resistance | Equal-thickness interference fringes | Moiré fringes | Luminance factor [%] | Angular range of visual field [o] |
|---|---|---|---|---|---|
| First example | o | o | Δ | 98 | 75 |
| Second example | o | o | Δ | 94 | 75 |
| Third example | o | o | Δ | 97 | 75 |
| Fourth example | o | o | Δ | 98 | 75 |
| First compared example | x | x | o | 100 | * |
| Second compared example | o | x | o | 92 | 80 |
| Third compared example | o | Δ | o | 99 | 75 |

*: Not measurable. At a position with a distance of 2 cm to the light source, the emitted light remarkably becomes dirk.

Although the present invention has been shown and described with respect to best mode examples thereof, it should be understood by those skilled in the art that the foregoing and various other changes, omissions, and additions in the form and detail thereof may be made therein without departing from the spirit and scope of the present invention.

What is claimed is:

1. An edge light type surface light source, comprising:
   an optical conductor composed of at least a transparent flat plate;
   a light source unit disposed adjacent to at least one of the side edge surfaces of said optical conductor;
   a light reflection layer formed on the rear surface of said optical conductor; and
   one or two lens array sheets, each lens array sheet, comprising:
      a transparent substrate;
      a lens array having lens elements that are one-dimensionally or two-dimensionally arranged on the front surface of said transparent substrate; and
      a cluster having a large number of cluster members randomly formed in a prism shape on the rear surface of said transparent substrate, wherein each of the length, the width, and the height of each of the cluster members is in the range from the wave length of source light to 500 μm and disposed on a light emitting surface of the front surface of said optical conductor so that the rear surface of said lens array sheets face the front surface of said optical conductor.

2. An edge light type surface light source as set forth in claim 1,
   wherein said lens array sheet is composed of two lens array sheet members that are layered, said cluster of the lower lens array sheet member facing the front surface of said optical conductor.

3. A transparent type display device, comprising:
   an edge light type surface light source as set forth in claim 2, said surface light source being used as a back light source for said transmission type display device.

4. The edge light type surface light source as set forth in claim 1, comprising:
   a light diffusion sheet arranged on the light emitting surface that is the front surface of said optical conductor and having concave and convex portions on the front and rear surfaces, the height of the concave and convex portions being homogeneous to or greater than the wave length of source light;
   a rear-surface flat lens array sheet having a lens array with lens elements that are one-dimensionally or two-dimensionally formed on the front surface of said transparent substrate, the rear surface of said rear-surface flat lens array sheet facing the front surface of said optical conductor; and
   a lens array sheet comprising:
      a transparent substrate;
      a lens array having lens elements that are one-dimensionally or two-dimensionally arranged on the front surface of said transparent substrate; and
      a cluster having a large number of cluster members randomly formed in a prism shape on the rear surface of said transparent substrate, wherein each of the length, the width, and the height of each of the cluster members is in the range from the wave length of source light to 500 μm,
   wherein said light diffusion sheet, said rear-surface flat lens array sheet, and said lens array sheet are layered in that order.

5. A transparent type display device, comprising:
   an edge light type surface light source as set forth in claim 4, said surface light source being used as a back light source for said transmission type display device.

6. A transparent type display device, comprising:
   a surface light source as set forth in one of claim 1, said surface light source being used as a back light source for said transmission type display device.

7. The edge light type surface light source as set forth in claim 1, comprising:
   a light diffusion sheet formed on the light emitting surface that is the front surface of said optical conductor and having concave and convex portions on the front and rear surfaces, the height of the concave and convex portions being homogeneous to or greater than the wave length of source light;
   a rear-surface flat lens array sheet having a lens array with lens elements that are one-dimensionally or two-dimensionally formed on the front surface of said transparent substrate, the rear surface of said rear-surface flat lens array sheet facing the front surface of said optical conductor; and
   a lens array sheet comprising:
      a transparent substrate,
      a lens array having lens elements that are one-dimensionally or two-dimensionally arranged on the front surface of said transparent substrate; and
      a cluster having a large number of cluster members randomly formed in a prism shape on the rear surface of said transparent substrate, wherein each of the length, the width, and the height of each of the cluster members is in the range from the wave length of source light to 500 μm, the two dimensional distribution being a random one in which the position of each lattice point of the two-dimensional periodic lattice is randomly moved and reallocated,
   wherein said light diffusion sheet, said rear-surface flat lens array sheet, and said lens array sheet are layered in that order.

8. A transparent type display device, comprising:
   an edge light type surface light source as set forth in claim 7, said surface light source being used as a back light source for said transmission type display device.

9. The edge light type surface light source as set forth in claim 4, comprising:

a light diffusion sheet formed on the light emitting surface that is the front surface of said optical conductor and having concave and convex portions on the front and rear surfaces, the height of the concave and convex portions being homogeneous to or greater than the wave length of source light;

a rear-surface flat lens array sheet having a lens array with lens elements that are one-dimensionally or two-dimensionally formed on the front surface of said transparent substrate, the rear surface of said rear-surface flat lens array sheet facing the front surface of said optical conductor; and a lens array sheet comprising:
  a transparent substrate;
  a lens array having lens elements that are one-dimensionally or two-dimensionally formed on the front surface of said transparent substrate; and
  a cluster having a large number of cluster members randomly formed in a prism shape on the rear surface of said transparent substrate,
  wherein each of the cluster members is composed of cluster member elements formed in a prism shape or a prismoid shape, each of the length of the minimum diagonal line and the height of the top and bottom of each of the cluster member elements being homogeneous to or greater than the wave length of the source light, each of the length of the maximum diagonal line and the height thereof being homogeneous to or smaller than 500 $\mu$m, the cluster member elements being allocated to structural elements of a percolation cluster in a two-dimensional lattice with a percolation probability being less than critical percolation concentration Pc, adjacent cluster member elements being fused,
  wherein said light diffusion sheet, said rear-surface flat lens array sheet, and said lens array sheet are layered in that order.

10. A transparent type display device, comprising:
an edge light type surface light source as set forth in claim 9, said surface light source being used as a back light source for said transmission type display device.

11. An edge light type surface light source, comprising:
an optical conductor composed of at least a transparent flat plate;
a light source unit disposed adjacent to at least one of the side edge surfaces of said optical conductor;
a light reflection layer formed on the rear surface of said optical conductor; and
one or two lens array sheets, each lens array sheet, comprising:
  a transparent substrate;
  a lens array having lens elements that are one-dimensionally or two-dimensionally arranged on the front surface of said transparent substrate, and
  a cluster having a large number of cluster members randomly formed in a prism shape on the rear surface of said transparent substrate, wherein each of the length, the width, and the height of each of the cluster members is in the range from the wave length of source light to 500 $\mu$m, the two dimensional distribution being a random one in which the position of each lattice point of the two-dimensional periodic lattice is randomly moved and reallocated and disposed on a light emitting surface of the front surface of said optical conductor so that said lens array sheets face the front surface of said optical conductor.

12. An edge light type surface light source as set forth in claim 11,
wherein said lens array sheet is composed of two lens array sheet members that are layered, said cluster of the lower lens array sheet member facing the front surface of said optical conductor.

13. A transparent type display device, comprising:
an edge light type surface light source as set forth in claim 12, said surface light source being used as a back light source for said transmission type display device.

14. A transparent type display device, comprising:
a surface light source as set forth in one of claims 11, said surface light source being used as a back light source for said transmission type display device.

15. An edge light type surface light source, comprising:
an optical conductor composed of at least a transparent flat plate;
a light source unit disposed adjacent to at least one of the side edge surfaces of said optical conductor;
a light reflection layer formed on the rear surface of said optical conductor; and
one or two lens array sheets, each lens array sheet comprising:
  a transparent substrate;
  a lens array having lens elements that are one-dimensionally or two-dimensionally formed on the front surface of said transparent substrate; and
  a cluster having a large number of cluster members randomly formed in a prism shape on the rear surface of said transparent substrate,
  wherein each of the cluster members is composed of cluster member elements formed in a prism shape or a prismoid shape, each of the length of the minimum diagonal line and the height of the top and bottom of each of the cluster member elements being homogeneous to or greater than the wave length of the source light, each of the length of the maximum diagonal line and the height thereof being homogeneous to or smaller than 500 $\mu$m, the cluster member elements being allocated to structural elements of a percolation cluster in a two-dimensional lattice with a percolation probability being less than critical percolation concentration Pc, adjacent cluster member elements being fused and disposed on a light emitting surface of the front surface of said optical conductor so that said lens array sheets face the front surface of said optical conductor.

16. An edge light type surface light source as set forth in claim 15,
wherein said lens array sheet is composed of two lens array sheet members that are layered, said cluster of the lower lens array sheet member facing the front surface of said optical conductor.

17. A transparent type display device, comprising:
an edge light type surface light source as set forth in claim 16, said surface light source being used as a back light source for said transmission type display device.

18. A transparent type display device, comprising: a surface light source as set forth in one of claim 15, said surface light source being used as a back light source for said transmission type display device.

* * * * *